United States Patent [19]

Monier

[11] Patent Number: 5,764,554

[45] Date of Patent: Jun. 9, 1998

[54] METHOD FOR THE IMPLEMENTATION OF MODULAR REDUCTION ACCORDING TO THE MONTGOMERY METHOD

[76] Inventor: Guy Monier, La Pinsonnette - 278 avenue des Amandiers, Les Brets 13340 Rognac, France

[21] Appl. No.: 554,781

[22] Filed: Nov. 7, 1995

[30] Foreign Application Priority Data

Nov. 8, 1994 [FR] France .................................. 94 13595

[51] Int. Cl.[6] ........................................................ G06F 7/72
[52] U.S. Cl. ........................................................... 364/746
[58] Field of Search ................................. 364/746, 746.1

[56] References Cited

U.S. PATENT DOCUMENTS

| 5,144,574 | 9/1992 | Morita | 364/746 |
| 5,513,133 | 4/1996 | Cressel et al. | 364/746 |
| 5,572,454 | 11/1996 | Lee et al. | 364/746.1 |

OTHER PUBLICATIONS

IEE Proceedings E Computers & Digital Techniques, vol. 141, No. 5, Sep. 1994, Stevenage GB, pp. 314–316 KOC.

*Primary Examiner*—David H. Malzahn

[57] ABSTRACT

A method for implementing modular reduction according to the Montgomery method, wherein a binary data element C is encoded on a number c of bits, grouped together in m' words of k bits, with m' and k as integers, m' being such that $m'*k>c>(m'-1)*k$, a non-zero binary data element N is encoded on a number n of bits. According to the disclosed method, to produce C mod N, steps are carried out for the production of a binary data element J0, associated with N, the production of at least one binary data element H having the form $2^{f(C,N)}$, with f(C,N) as an integer representing the size of C and the parity of N, and the providing firstly of C, at the parallel input of a multiplication circuit having one serial input, one parallel input and one serial output, and secondly of H at the serial input of this same multiplication circuit.

21 Claims, 6 Drawing Sheets

METHOD FOR THE IMPLEMENTATION OF MODULAR REDUCTION ACCORDING TO THE MONTGOMERY METHOD

BACKGROUND OF THE INVENTION

1. Field of the Invention

The invention relates to a method for the implementation of a modular reduction according to the Montgomery method. This method enables the performance of modular computations in a finite field (or Galois field) denoted $GF(2^n)$ without the performance of divisions.

2. Discussion of the Related Art

Conventionally, modular operations on $GF(2^n)$ are used in cryptography for applications such as authentication of messages, identification of a user and exchange of keys. Such exemplary applications are described, for example, in the French patent application published under No. 2 679 054.

There are commercially available integrated circuits dedicated to such applications. These include, for example the product referenced as ST16CF54 manufactured by SGS-THOMSON MICROELECTRONICS S.A., built around an association of the type comprising a central processing unit and an arithmetic coprocessor and dedicated to the performance of modular computations. The coprocessor used enables the performance of the modular operations on binary data encoded on m words of k bits, with k=32 and m=8 or 16, by the use of the Montgomery method. It is the object of a European patent application filed under the reference No. 0 601 907 A2, and is illustrated in FIG. 1 (this figure corresponds to FIG. 2 of the European patent application referred to).

The basic operation, called a $P_{field}$ operation, consists of the production, on the basis of three binary data elements A (multiplicand), B (multiplier) and N (modulo) encoded on a whole number of bits n, of a binary data element denoted $P(A, B)_N$ encoded on n bits, such that $P(A, B)_N = A*B*I \mod N$, with I as a binary data element encoded on n bits such that $I=2^{-n} \mod N$. Of course, we will have: n=m*k.

The circuit also makes it possible, by extension, to perform a modular reduction, namely to compute C mod N, with C as a binary data element encoded on m words of k bits.

The method implemented is the following:
production of $H=2^n \mod N$,
production of $P(C, H)_N$.

The modular reduction method implemented by the circuit shown in FIG. 1 includes the following stages:

1. Computation of a parameter H ($H=2^{m*k} \mod N$) and a parameter $J_0$ encoded on k bits, with $J_0 = -N_0^{-1} \mod 2^k$, $N_0$ being the least significant word of the modulo N, and storage of $J_0$ in a k-bit register 17.

2. Loading of the multiplier B and of the modulo N in respective n-bit registers 10 and 12, with n=m*k, and initialization of an n-bit register 11 at zero, the contents of this register being referenced S, with S as a variable binary data element encoded on n bits.

3. Setting up of a loop, indexed i, with i varying from 1 to m, each $i^{th}$ iteration comprising the following steps:

a) transfer of the $i^{th}$ word $C_{i-1}$ of the data element M from a register 16 to a storage flip-flop circuit 21,
   b) production of a value $X(i)=S(i-1)+H*C_{i-1}$ with $S(0)=0$ and $S(i-1)$ as the so-called updated value of S, defined hereinafter, by:

I—making a right shift of the contents of the register 10 tos the input of a first serial-parallel multiplication circuit 19 with the looping of the output of the register 10 to its input, II—multiplying the bits of H by $C_{i-1}$, III—making a right shift of the contents of the register 12, with looping of the output to the input, IV—determining the updated value of S(i-1) as being the value stored in the register 11 after the $(i-1)^{th}$ iteration if this updated value is smaller than N and, if this updated value is greater than N, making a serial subtraction of N from this updated value in a first serial subtraction circuit 28, the value that results therefrom being the updated value of S(i-1), and V—making a right shift of the contents of the resister 11 and carrying out a bit-by-bit addition of the value of the multiplication $H*C_{i-1}$ to the updated value of S(i-1) in a first serial addition circuit 30, c) multiplication of the least significant word of X(i), $X_0(i)$ by $J_0$ in a second serial-parallel multiplication circuit 20, and entering of the value $X_0(i)*J_0 \mod 2_k = Y_0(i)$ in a register 18, and simultaneously the delaying of N and X(i) by k cycles in delay circuits 32 and 34, d) computation of a value $Z(i)=X(i)+Y_0(i)*N$ by:

I—multiplying $Y_0(i)$ by N, delayed by k cycles, in the second multiplication circuit 20, and II—adding X(i) to the value $Y_0(i)*N$ in a second serial addition circuit 31, e) not taking account of the least significant word of Z(i) and storing the remaining words, namely $Z(i)/2^k$, in the register 11, f) making a bit-by-bit comparison of $Z(i)/2^k$ with N in order to determine the updated value S(i) of the next iteration, in the manner described here above, this comparison being done through the bit-by-bit subtraction of $Z(i)/2^k$ and N in a second serial subtraction circuit 29, N having been delayed by k additional cycles, g) the $i^{th}$ word of the multiplicand C being loaded into the register 16 at any point in time during the above operations.

4. At the $m^{th}$ iteration, ignoring the least significant word of Z(m) and entering the remaining words, namely $Z(m)/2^k$, into the register 10.

5. Output of the result stored in the register 10 at the last iteration, possibly subtracted from N by means of a third serial subtraction circuit 27, if $Z(m)/2^k) \geq N$.

On the whole, if the period of the clock signal synchronizing the operation of the circuit of FIG. 1 is called a cycle, then the time needed for the processing of a modular multiplication can be broken down chiefly into:

n*(n+1) cycles for the computation of H, n cycles for the step 2, m*(n+2*k+x) cycles for the combined steps 3 and 4, with x as an integer, n cycles for the step 5.

In practice, x is a function of the initialization of the circuit, i.e. chiefly of the setting up of the control signals (of multiplexers for example) to ensure the consistent operation of the circuit. In practice, it may be considered for example that x=7.

With regard to the first step, the parameter $J_0$ is computed by the central processing unit (software method).

We have $H*I^2=1 \mod N$. This makes it possible to give an exact result, i.e. a result equal to C mod N, during the step 5 of the modular multiplication method described here above.

Furthermore, the computation of H is clone by means of the coprocessor, according to the following method described with reference to FIG. 2 which corresponds to FIG. 9 of the European patent application referred to.

To compute H, the following operation is performed (see also page 20, line 47 to page 25, line 52 of the above-mentioned European patent):

1. loading of N into the register 12 and initializing of the register 10 at B(0)=0, 2. simultaneously:
   right shift and bit-by-bit subtraction of B(0) and N in a serial subtractor 27 with a left shift by one unit of the result R(0)=B(0)–N mod $2^{m'*k}$, the shift being done in the subtractor in putting out a first bit at 0,
   loading of B(1)=2*R(0) into the register 10,
   bit-by-bit subtraction of 2*R(0) and N to determine whether 2*R(0) is $\geq$ or <N, this subtraction being done in a second subtractor 40, with the testing, in a circuit 44, of the result of the subtraction,
   if B(1)$\geq$N, then loading of B(2)=B(1)–N into the register 10, else loading of B(2)=B(1).

We have B(2)=H=$2^n$ mod N.

The inventor has sought to improve the modular reduction method implemented.

Indeed, the coprocessor as used at present has working limitations, notably:

it is not possible to process binary data elements having sizes different from n bits, that is, in practice, the useful size of the data elements is not taken into account, and this coprocessor does not perform modular operations with even-parity modulo values, the computation of $J_0$ being capable of being performed only if $N_0$ is an odd-parity value.

SUMMARY OF THE INVENTION

The invention proposes the use of the assembly formed by the central processor unit and coprocessor so as to enable the elimination of the above-discussed limitations.

The invention proposes a method for the implementation of modular reduction according to the Montgomery method, wherein:

a binary data element C is encoded on a number c of bits, grouped together in m' words of k bits, with m' and k as integers, m' being such that m'*k$\geq$c>(m'–1)*k, a non-zero binary data element N is encoded on a number n of bits, wherein, to produce C mod N, steps are carried out for the production of at least one binary data element $J_0$, associated with N, for the production of at least one binary data element H having the form $2^{f(C,N)}$, with f(C, N) as an integer representing the size of C and the parity of N, and for the providing firstly of C, at the parallel input of a multiplication circuit having one serial input, one parallel input and one serial output, and secondly of H at the serial input of this same multiplication circuit.

The invention also proposes the performance of the following steps for the production of C mod N, with the least significant bit of N being equal to 0:

E0—production of a binary data element $J_0$(N'), with N' as a binary data element encoded on n bits such that N' has one least significant bit at 1 and N=N'*2a, with a as an integer $\geq$1, E1—production of a binary data element H=$2^{m'*k}$ mod N', E3—providing of C, encoded on m'*k bits, at the serial input of the multiplication circuit, and of H encoded on n bits at the serial input of this same multiplication circuit to obtain a data element P(C, H)$_{N'}$=C*$2^{-a}$ mod N', E4—production of $2a$*P(C, H)$_{N'}$=C mod N.

This method enables the performance of modular reductions with an even-parity modulo and C as a data element of any size.

The invention also provides the performance of the following steps for the production of C mod N:

E0—production of a binary data element $J_0$(N),

E1—production of a binary data element H=$2^{m'*k-a}$ mod N,

E3—the providing of C, encoded on m'*k bits, at the parallel input of the multiplication circuit, and of H encoded on n bits, at the parallel input of this same multiplication circuit to obtain a P(C, H)$_N$=C mod N.

This method enables the performance of modular reductions for an odd-parity modulo, C being of any size.

BRIEF DESCRIPTION OF THE DRAWINGS

The invention will be understood more clearly and other features and advantages shall appear from the following description of embodiments of the invention. This description is given as an indication that in no way restricts the scope of the invention, and is to be read in conjunction with the appended drawings, of which.

DETAILED DESCRIPTION

Figure 1:
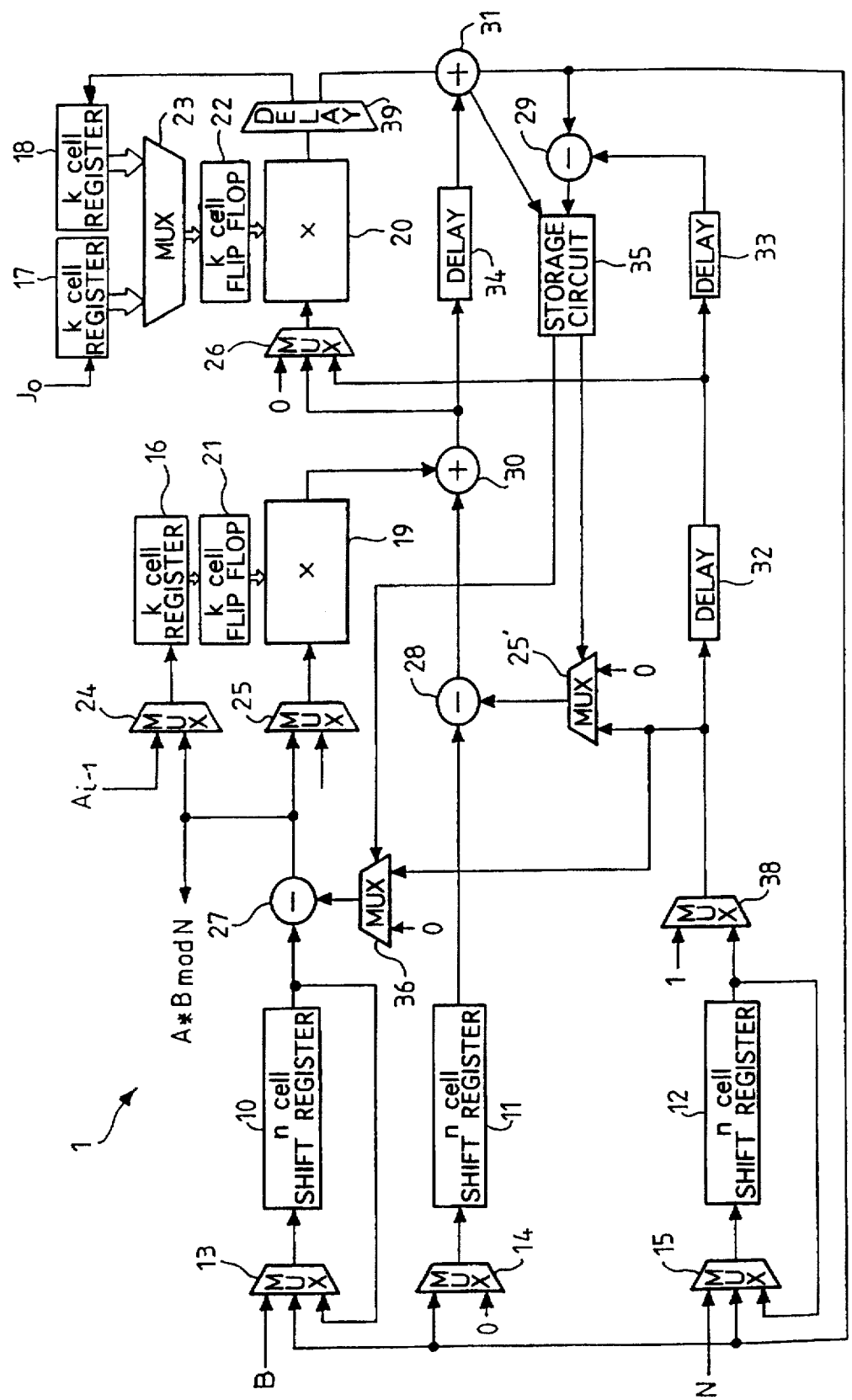
FIG. 1 gives a schematic view of a circuit enabling the performance of the modular operations according to the Montgomery method.

FIG. 1 shows a modular processing logic circuit 1.

In practice, this circuit 1 is associated with a central processing unit (not shown) that enables its operation to be controlled by means of a sequencing circuit (not shown).

This circuit comprises:

three shift registers 10, 11 and 12 with serial input and output. Each of these registers has one and the same number n of cells, with n=m*k. These registers may be such that they are capable of being divided, for example into registers of n/2 cells and into registers of k bits for the registers 10 and 12, multiplexers 13, 14 and 15 are placed respectively before the register 10, 11 and 12. Multiplexers will also be placed before the subdivisions if these subdivisions exist, three registers 16, 17 and 18 each comprising k cells. The registers 16, 17 and 18 are parallel output and serial input registers, two multiplication circuits 19 and 20, each comprising one serial input, one parallel input and one serial output. The parallel input of the multiplication circuit 19 is connected to the output of the register 16 by means of a storage flip-flop circuit 21 having k cells. The parallel input of the multiplication circuit 20 is connected to one of the outputs of the registers 17 or 18, by means of a storage flip-flop circuit 22 having k cells. This flip-flop circuit 22 is itself connected to one of the outputs of the registers 17 and 18 by means of a multiplexer with two parallel inputs and one parallel output, multiplexers 24, 25, 25', 26, 36 and 38, a demultiplexer 39, serial subtraction circuits 27, 28 and 29, serial adder circuits 30 and 31, delay circuits 32,33 and 34 to delay the propagation of binary data elements by k cycles, a storage circuit 35 to store the comparison result.

Figure 3:
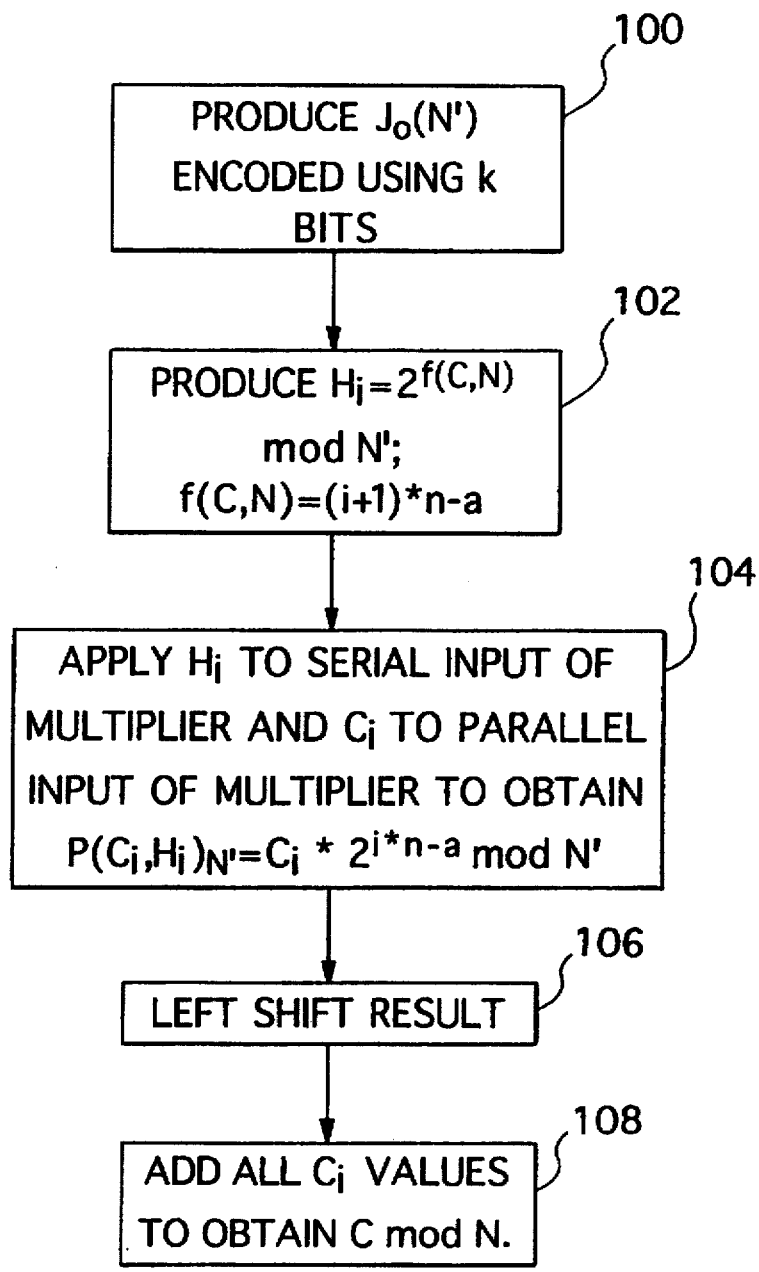
FIG. 3 is a flowchart of the modular reduction method in one embodiment of the present invention.

For further details, reference could be made to the European patent application referred to (EP-0 601 907 A2) and especially to FIG. 3 of this application and to the passages in the description pertaining thereto: these are page 15, line 54, to page 16, line 13, and page 17, line 50, to page 18, line 55.

The circuit of FIG. 1 enables the invention to be implemented.

Figure 2:
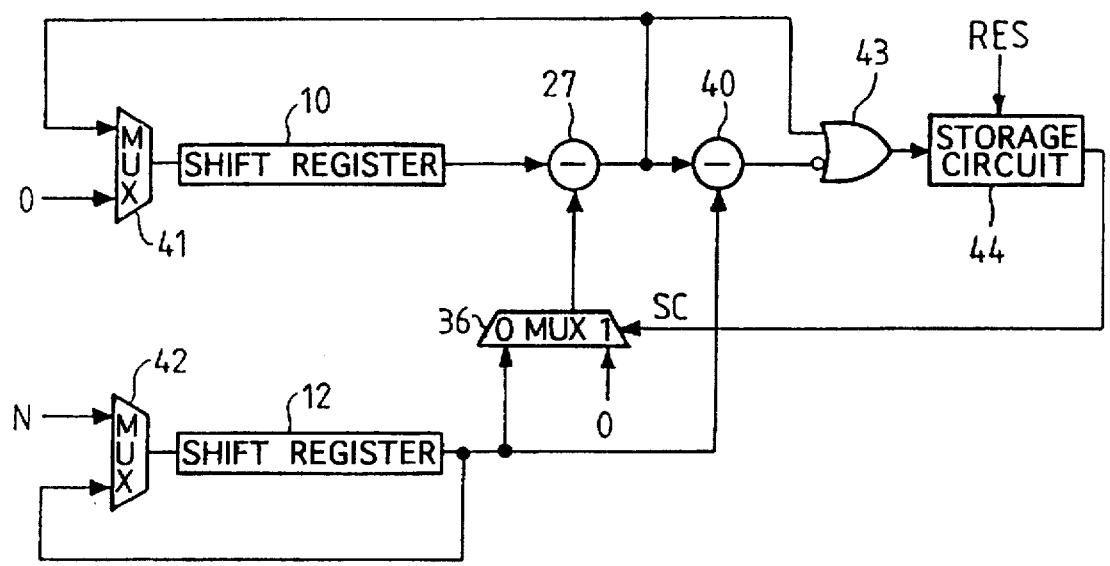
FIG. 2 shows a circuit implemented in the computation of an error correction parameter according to the invention.

FIG. 2 shows a circuit comprising:

the two shift registers 10 and 12, the subtraction circuit 27, the multiplexer 36, two multiplexers with two inputs 41 and 42, the respective outputs of which are connected respectively to the inputs of the registers 10 and 12, a serial subtraction circuit 40, a two-input NAND gate 43, a storage circuit 44 to store the result of the comparison.

The subtraction circuits 27 and 40 have two serial inputs and one serial output.

The subtraction circuit 27 has a first input connected to the output of the register 10.

The output of this subtraction circuit 27 is connected to a first input of the subtraction circuit 40. The subtraction circuit 40 has its second input connected to the output of the register 12, and its output connected to an inverter input of the gate 43.

The other (non-inverter) input of the gate 43 is connected to the output of the subtraction circuit 27. Its output is connected to an input of the circuit 44. This circuit 44 has another input to receive a resetting signal RES.

The multiplexer 36 has two inputs and one output. Its output is connected to the second input of the subtraction circuit 28. Its inputs are connected respectively to the output of the register 12 and to a ground (potential corresponding to a logic 0). The multiplexer 36 selectively connects its output to its first or second input depending on the state of a selection signal SC received from the circuit 44 (for example to the first input if SC=0, and to the second input if SC=1).

The multiplexer 41 has its inputs connected respectively to the output of the subtraction circuit 27 and to the ground.

The multiplexer 42 has its inputs connected respectively to the output of the register 12 and to an input terminal for the serial reception of a binary data element (in practice, the modulo N).

The circuit of FIG. 2 is used to produce an error correction parameter H which is a binary data element.

It is desired to carry out a modular reduction operation, referenced C mod N, namely to produce a binary data element by the handling of two other binary data elements.

Several methods can be envisaged.

It will be assumed initially that we have:

C and N as binary encoded data elements, $N=N'*2^a$, with

N as an even parity value (least significant bit at zero),

N', as a binary encoded data element which is an odd parity number (least significant bit equal to one), and a as an integer greater than or equal to 1, N encoded on 1 useful bits, 1 being a non-zero integer with $u*k \geq 1 > (u-1)*k$, and u as a non-zero integer such that $u \leq m$. N' is therefore encoded on 1—a useful bits, C encoded on c useful bits and m' words, with:

c as any integer, m' as an integer such that $m'*k \geq c > (m'-1)*k$, m" as an integer such that $m"*m \geq m' > (m"-1)*m$, v as a non-zero integer such that $v*u \geq m' > (v-1)*u$, w as an integer such that $w*1 \geq c > (w-1)*1$.

The terms "useful size" or "useful number of bits" of a data element will be understood to mean the minimum number of bits needed and sufficient to represent a data element, namely the minimum number of bits such that the most significant bit is equal to one.

Conventionally, a, 1, u, v, c, m', m" and w will be determined by means of the central processing unit associated with the coprocessor, which gives it the binary data elements to be processed.

I—Division of C into n-bit data elements

A first method (FIG. 3) includes assuming that C is encoded on a whole number of bits which is a multiple of n and that N' is encoded on n bits.

I.1—Method

If m'>m (namely m">1), the following can be written:

$C = \Sigma_i C_i * 2^{i*n}$ with i as an index varying from 0 to m"−1, and $C_i$ as a binary data element encoded on n bits.

It will be noted that $C_{m"-1}$ has its (m"*n−c) most significant bits at zero.

From the above definition of C, it is deduced that:

$$C \bmod N = (\Sigma_i C_i * 2^{i*n}) \bmod N$$
$$= (\Sigma_i (C_i * 2^{i*n} \bmod N)) \bmod N$$
$$= [(\Sigma_i (C_i * 2^{i*n-a} \bmod N')) \bmod N'] * 2^a$$

It is enough to proceed in the following steps:

E0—production of $J_0(N')$, data element encoded in binary mode on k bits (step 100), E1—for i varying from 1 to m"−1, the performance of the following operations:

production of a binary data element $H_i = 2^{(i+1)*n-a} \bmod N' = 2^{f(C,N)} \bmod N'$, with $f(C,N) = (i+1)*n-a$ (step 102), providing of $H_i$ encoded on n bits, at the serial input of the multiplication circuit 19, and of $C_i$, encoded on n bits, at the parallel input of this same multiplication circuit (step 104), to obtain:

$P(C_i, H_i)_N = C_i * 2^{i*n-a} \bmod N'$, carrying out a left shift of the result by a bits to obtain $C_i * 2^{i*n} \bmod N$ and storage of this result (step 106), E2—for i=0, storage of $C_0$ if $C_0 < N$, or of $C_0 - N$ if $C_0 > N$, E3—performing a modular addition of the $C_i$ values stored and of $C_0$ or $C_0 - N$ to obtain C mod N (step 108).

Typically, the steps E0, E2 and E3 will be carried out by the central processing unit (software method). The step E1 will use the circuits shown in FIGS. 1 and 2 to compute $H_i$ and $C_i * 2^{i*n-a} \bmod N'$.

The left shift of $P(C_i, H_j)_{N'}$, which amounts to producing $2^a * P(C_i, H_j) N'$ could be done either in reality in a register or fictitiously by the central processing unit.

The procedure could use a wired circuit specifically developed to perform the steps E2 and E3. However, this would increase the area of the central processing unit and coprocessor.

Of course, if $c \leq n$, only the step E2 will be implemented.

L2—Production of the values of $C_i * 2^{i*n-a}$ mod N', with i varying from 1 to m"−1

To produce the values of $C_i * 2^{i*n-a}$ mod N', the following steps will be performed:

For i varying from 1 to m"−1:

R1—the loading of the parameter $H_i$ into the register 10 and of the value of the modulo N' into the register 12, and the initialization of the n-bit register 11 at zero, the contents of this register 11 being denoted S, with S as a variable binary data element encoded on n bits, R2—the setting up of a loop, indexed by s, with s varying from 1 to m, each $s^{th}$ iteration comprising the following operations:
  a) transfer of the $s^{th}$ word $C_{i,s-1}$ of the data elements Ci from the register 16 to the storage flip-flop circuit 21,
  b) production of a value $X(s)=S(s-1)+H_i*C_{i,s-1}$ with $S(0)=0$ (n bits at zero) and $S(s-1)$ as the so-called updated value of S, defined hereinafter, by:
    I—making a right shift of the contents of the register 10 to the input of a first serial-parallel multiplication circuit 19 with the looping of the output of the register 10 to its input,
    II—multiplying the bits of $H_i$ by $C_{i,s-1}$,
    III—making a right shift of the contents of the register 12, with looping of the output to the input,
    IV—determining the updated value of $S(s-1)$ as being the value stored in the register 11 after the (s−1)th iteration if this updated value is smaller than N' and, if this updated value is greater than N', making a serial subtraction of N' from this updated value in the subtraction circuit 28, the value that results therefrom being the updated value of $S(s-1)$, and
    V—making a right shift of the contents of the register 11 and carrying out a bit-by-bit addition of the value of the multiplication $H_i*C_{i,s-1}$ to the updated value of $S(s-1)$ in the addition circuit 30,
  c) multiplication of the least significant word of X(s), $X_0(s)$ by $J_0$ in the multiplication circuit 20, and entering of the value $X_0(s)*J_0$ mod $2^{k=Y_0}(s)$ into the register 18, and simultaneously delaying of N' and X(s) by k cycles in delay circuits 32 and 34,
  d) computation of a value $Z(s)=X(s)+Y_0(s)*N'$ by:
    I—multiplying $Y_0(s)$ by N', delayed by k cycles, in the second multiplication circuit 20, and
    II—adding X(s) to the value $Y_0(s)*N'$ bit by bit in the addition circuit 31,
  e) not talking account of the least significant word of Z(s) and storing the remaining words, namely $Z(s)/2^k$ in the register 11,
  f) comparing $Z(s)/2^k$ with N', bit by bit, in order to determine the updated value S(s) of the next iteration in the manner described here above, this comparison being made by the bit-by-bit subtraction of $Z(s)/2^k$ and N' in the subtraction circuit 29, N' having been delayed by k additional cycles in the delay circuit 33,
  g) the $s^{th}$ word of $C_i$ being loaded into the register 16 at any point in time during the above operations, R3—at the $m^{th}$ iteration, ignoring the least significant word of Z(m) and entering the remaining words, i.e. $Z(m)/2^k$, into the register 10, R4—output of the result stored in the register 10 at the last iteration, possibly subtracted from N' if need be, by means of the subtraction circuit 27.

L3—Production of Hi for i varying from 1 to m"−1

To produce $H_i=2^{(i+1)*n-a}$ mod N', it is possible to resume the already existing method (namely on the basis of subtractions only) by performing (i+1)*n−1+1 successive subtractions.

The operation is performed as follows:

H1—loading of N' into the register 12 and initialization of the register 10 at B(0)=0 (n bits at 0), H2—output of N' from the register 12 by right shifting, with looping to its input, of 1−a bits, in order to have a most significant bit at 1 in the register 12, H3—production and storage of a data element B(1)=2* (B(0)−N"), encoded on n bits, with $N"=N'*2^{n-1+a}$, N" corresponding to the binary data elements stored in the register 12, by:
  output of N" and B(0) by the right shift, in the registers 10 and 12, of the contents of these registers, the input of the register 10 being connected to the output of the subtraction circuit 27 and the input of the register 12 being connected to its output,
  bit-by-bit subtraction, in the subtraction circuit 27, of the bits of N" and B(0) as and when they make their exit, with the left shift by one unit of the result denoted R(0)=B(0)−N", the shift being done in the subtractor in bringing out the first bit at 0,
  loading of the result of the subtraction after shifting, denoted B(1)=2*R(0), into the register 10,
  bit-by-bit subtraction in the subtraction circuit 40 of B(1) and N", to determine whether B(1) is $\geq$ or <N", and production by the circuit 44 of SC=0 if B(1) $\geq$N", and of Sc=1 if B(1)<N", H4—setting up of a loop indexed by an index s, with s varying from 1 to (i+1)*n−1, each iteration comprising the following operations:
  if B(s)<N", then loading into the register 10 of B(s+1) =2*(B(s)−0)=2*B(s), after left shifting by one unit and bit-by-bit comparison of B(s+1) and N",
  else, bit-by-bit subtraction of N" and B(s) with left shift of the result by one unit and loading into the register 10 of B(s+1)=2*(B(s)−N"), and bit-by-bit comparison of B(s+1) and N", H5—if B((i+1)*n−1+1)$\geq$N": bit-by-bit subtraction of B((i+1)*n−1+1) and N" and loading of the result into the register 10 with right shift by one unit of the result. We have $2^{n+(i+1)*n-1}$ mod N" in the register 10.

H6—right shift by n−1+a bits in the registers 10 and 12. These registers then respectively contain $2^{n+i*n-a}$ mod N' and N'.

L4—Modified computation of H

It can be seen that the greater the value of m", the greater is the number of subtractions. This entails penalties as regards computation time since each subtraction requires n cycles to shift the n bits stored in the registers 10 and 12.

One variant can be envisaged. This variant includes performing the subtractions only for the error correction parameter $H_1$ associated with i=1, and then obtaining the error correction parameters $H_i$ associated with the higher index values by the performance of $P_{field}$ operations.

The following procedure will be used:

production of $H_1=2^{2*n-a}$ mod N' (2*n−1+1 subtractions), for i>1:

computation of p(i)=Ent[$\log_2(i*n/(n-a))$]+1, in the central processing unit (software method), Ent designating the "integer part" operator, performance of p(i) operations $P_{field}$ by means of the circuit of FIG. 1 (reference could be made to the description on page 19, line 50, to page 20, line 45, of the above-mentioned European patent application):

$H_{i,t} = P(H_{i,t-1}, H_{i,t-1})_{N'} = 2^{n+2exp(t)*(n-a)} \mod N'$ with t as an index from 1 to p(i) and $H_{i,0} = H_1$.

We obtain:

$H_{i,p(i)} = 2^{n+2exp(p(i))*(n-a)} \mod N'$, exp designating the exponentiation function, computation of $r = 2p(i)*(n-a) - i*n + a$ in the central processing unit (software method).

If $r > n$, storage of $H_{i,p(i)}$, then computation of $2^{n-r} \mod N'$ by adequate combination of $P_{field}$ operations.

The computation of $2^{n-r} \mod N'$ will be done as follows: appropriate choice of binary data elements $D_i = 2^{-x(i)*n+y(i)*a} \mod N'$, associated with pairs of integers (x(i), y(i)), performance of operations $P(D_i, D_j)_{N'} = 2^{-(x(i)+x(j)+1)*n+(y(i)+y(j))*a} \mod N'$ to obtain $2^{n-r} \mod N' = 2^{-x*n+y*a} \mod N'$, the providing the data elements $H_{i,p(i)}$ if $n-r \geq 0$ (or of $2^{n-r} \mod N'$ if $n-r<0$), encoded on n bits, at the serial input of the multiplication circuit 19 and at the same time the providing of $2n-r$ (or of $H_{i,p(i)}$ if $n-r<0$) encoded on n bits, at the parallel input of this same multiplication circuit, to obtain $H_i$.

We have $H_i = 2^{(i+1)*n-a} \mod N'$.

II—Division of M in 1-bit data elements

Figure 4:
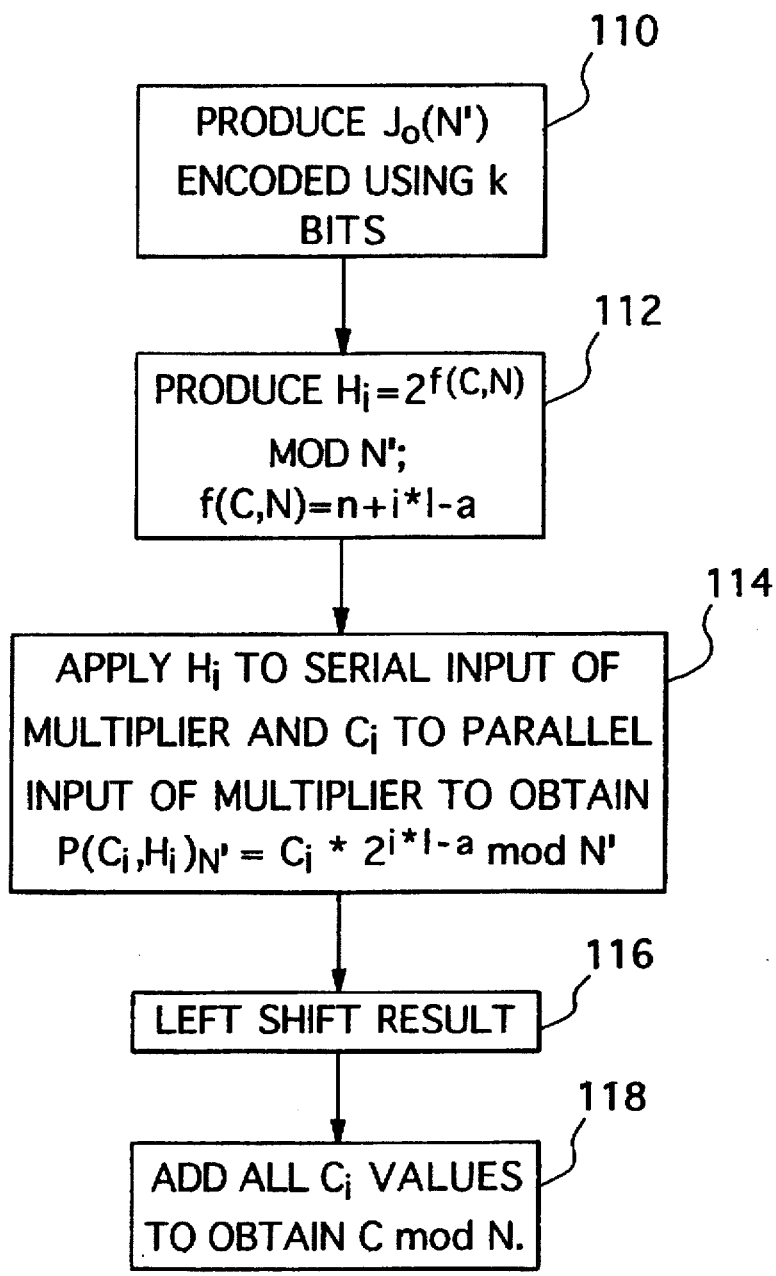
FIG. 4 is a flowchart describing the modular reduction method in another embodiment of the present invention.

In another method, shown in FIG. 4, it is assumed that C is encoded on a whole number of bits which is a multiple of 1.

II.1—Method

If $w>1$, we can write $C = \Sigma_i C_i = 2^{i*1}$ with i varying from 0 to w-1.

We deduce the following therefrom:

$$C \mod N = (\Sigma_i C_i * 2^{i*1}) \mod N$$
$$= (\Sigma_i (C_i * 2^{i*1} \mod N)) \mod N$$
$$= [(\Sigma_i (C_i * 2^{i*1-a} \mod N')) \mod N'] * 2^a$$

It is enough to proceed according to the following steps:

E0—production of $J_0(N')$, data element encoded in binary mode on k bits (step 112), E1—for i varying from 1 to w-1, the performance of the following operations:

production of $H_i = 2^{n+i*1-a} \mod N' = 2^{f(C,N)=n+i*1} - a$ (step 112), providing of $C_i$ encoded on n bits, at the parallel input of the multiplication circuit 19, and of $H_i$, encoded on n bits, at the serial input of this same multiplication circuit (step 114), to obtain $C_i * 2^{i*1-a} \mod N'$, carrying out a left shift of the result by a bits to obtain $C_i * 2^{i*1} \mod N$ and storing this result (step 116), E2—for i=0, storage of $C_0$ if $C_0<N$, or of $C_0-N$ if $C_0 \geq N$, E3—performing a modular addition of the $C_i$ values stored and of $C_0$ or $C_0-N$ to obtain $C \mod N$ (step 118).

To carry out the computations of $H_i$ and $C_i * 2^{i*1-a} \mod N'$, the procedure will be similar to the preceding one.

II.2—Production of the values of $C_i * 2^{i*1-a} \mod N'$, with i varying from 1 to w-1

To produce the values of $C_i * 2^{i*1-a} \mod N'$, the following steps will be performed:

For i varying from 1 to w-1:

R1—loading of the parameter $H_i = 2^{n+i*1-a} \mod N'$ into the register 10 and of the modulo N' into the register 12, and initialization of the n-bit register 11 at zero, the contents of this register 11 being denoted S, with S as a variable binary data element encoded on n bits, R2—setting up of a loop, indexed by s, with s varying from 1 to m, each sth iteration comprising the following operations:

a) transfer of the $s^{th}$ word $C_{i,s-1}$ of the data element Ci from the register 16 to the storage flip-flop circuit 21, b) production of a value $X(s) = S(s-1) + H_i * C_{i,s-1}$ with $S(0)=0$ (n bits at zero) and $S(s-1)$ as the so-called updated value of S, defined hereinafter, by:

I—making a right shift of the contents of the register 10 tos the input of the serial-parallel multiplication circuit 19 with the looping of the output of the register 10 to its input, II—multiplying the bits of $H_i$ by $C_{i,s-1}$, III—making a right shift of the contents of the register 12, with looping of the output to the input, IV—determining the updated value of S(s-1) as being the value stored in the register 11 after the (s-1)th iteration if this updated value is smaller than N', and, if this updated value is greater than N', making a serial subtraction of N' from this updated value in the subtraction circuit 29, the value that results therefrom being the updated value of S(s-1), and V—making a right shift of the contents of the register 11 and carrying out a bit-by-bit addition of the value of the multiplication $H_i * C_{i,s-1}$ to the updated value of S(s-1) in the addition circuit 30, c) multiplication of the least significant word of X(s), $X_0(s)$ by $J_0$ in the multiplication circuit 20, and entering of the value $X_0(s) * J_0 \mod 2^k = Y_0(s)$ into the register 18, and simultaneously the delaying of N' and X(s) by k cycles in delay circuits 32 and 34, d) computation of a value $Z(s) = X(s) + Y_0(s) * N'$ by:

I—multiplying $Y_0(s)$ by N', delayed by k cycles, in the second multiplication circuit 20, and II—adding X(s) to the value $Y_0(s) * N'$ bit-by-bit in the addition circuit 31, e) not taking account of the least significant word of Z(s) and storing the remaining words, namely $Z(s)/2^k$, in the register 11, f) comparing $Z(s)/2^k$ with N', bit by bit, in order to determine the updated value S(s) of the next iteration in the manner described here above, this comparison being made by the bit-by-bit subtraction of $Z(s)/2^k$ and N' in the subtraction circuit 29, N' having been delayed by k additional cycles in the delay circuit 33, g) the $s^{th}$ word of $C_i$ being loaded into the register 16 at any point in time during the above operations, R3—at the $m^{th}$ iteration, ignoring the least significant word of Z(m) and entering the remaining words, i.e. $Z(m)/2^k$, into the register 10, R4—output of the result stored in the register 10 at the last iteration, possibly subtracted from N' if necessary, by means of the subtraction circuit 27.

II.3—Production of Hi for i varying from 1 to w-1

To produce $H_i = 2^{n+i+1-a} \mod N'$, it is possible to resume the already existing method (namely the operation based on subtractions only) by performing $i*1+n-1+1$ successive subtractions.

The operation is performed as follows:

H1—loading of N' into the register 12 and initialization of the register 10 at B(0)=0 (n bits at 0), H2—output of N' from the register 12 by right shifting, with looping to its input, of 1-a bits, in order to have a most significant bit at 1 in the register 12, H3—production and storage of a data element $B(1)=2*(B(0)-N'')$, encoded on n bits, with $N''=N'*2^{n-1+a}$, N'' corresponding to the binary data elements stored in the register 12 by:

output of N'' and B(0) by right shifting in the registers 10 and 12 of the contents of these registers, the input of the register 10 being connected to the output of the subtraction circuit 27 and the input of the register 12 being connected to its output, bit-by-bit subtraction, in the subtraction circuit 27, as and when they make their exit, of the bits of N'' and B(0), with the left shift by one unit of the result denoted $R(0)=B(0)-N''$, the shift being done in the subtractor in bringing out the first bit at 0, loading of the result of the subtraction after shifting, denoted $B(1)=2*R(0)$, into the register 10, bit-by-bit subtraction in the subtraction circuit 40 of B(1) and N'', to determine whether B(1) is $\geq$ or < than N'', and production by the circuit 44 of SC=0 if $B(1) \geq N''$, and of Sc=1 if $B(1)<N''$, H4—setting up of a loop indexed by an index s, with s varying from 1 to n+i*1-1, each iteration comprising the following operations:

if $B(s)<N''$, then loading into the register 10 of $B(s+1)=2*(B(s)-0)=2*B(s)$, after left shifting by one unit and bit-by-bit comparison of B(s+1) and N'', else, bit-by-bit subtraction of N'' and B(s) with left shift of the result by one unit and loading into the register 10 of $B(s+1)=2*(B(s)-N'')$, and bit-by-bit comparison of B(s+1) and N'', H5—if $B(n+i*1-1+1) \geq N''$: bit-by-bit subtraction of B(n+i*1-1+1) and N'' and loading of the result into the register 10 with right shift by one unit of the result. We have $2^{2*n+i*1-1}$ mod N'' in the register 10.

H6—right shift by n-1+a bits in the registers 10 and 12. These registers then respectively contain $2^{n+i*1-a}$ mod N'' and N'.

II.4—Modified production of H

One variant can be envisaged. This variant is similar to the one described here above:

production of $H_1=2^{n+1-a}$ mod N' (n+1 subtractions), for i>1:

computation of $p(i)=Ent[\log_2(i*1/(1-a))]+1$, performance of p(i) operations $P_{field}$ by means of the circuit of FIG. 1:
 $H_{i,t}=P(H_{i,t-1},H_{i,t-1})_{N'}=2^{n+2exp(t)*(1-a)}$ mod N'
 with t as an index varying from 1 to p(i) and $H_{i,0}=H_1$.
 We obtain:
 $H_{i,p(i)}=2^{n+2exp(p(i))*(1-a)}$ mod N' exp designating the exponentiation function,
 computation of $r=2^{p(i)}*(1-a)-i*1+a$ in the central processing unit (software method).

If r>m, storage of $H_{i,p(i)}$, then computation of $2^{n-r}$ mod N' by adequate combination of $P_{field}$ operations.

The computation of $2^{n-r}$ mod N' will be done as follows:

appropriate choice of binary data elements $D_j=2^{-x(i)*n+y(i)*a}$ mod N', associated with pairs of integers (x(i), y(i)), sequence of the operations $P(D_i,D_j)_{N'}=2^{-(x(i)+x(j)+1)*n+(y(i)+y(j))*a}$ mod N' to obtain $2^{n-r}$ mod $N'=2^{-x*n+y*a}$ mod N', the providing of the data elements $H_{i,p(i)}$ if n-r$\geq$0 (or of $2^{n-r}$ mod N' if n-r<0), encoded on n bits, with the serial input of the multiplication circuit 19 and at the same time the providing of $2^{n-r}$ (or of $H_{i,p(i)}$ if n-r<0) encoded on n bits, with the parallel input of this same multiplication circuit, to obtain Hi.

We have $Hi=2^{n+i-a}$ mod N'.

III—Successive providing of the words of C to the multiplication circuit

It is assumed that:

N is encoded on u*k bits, with u*k-l most significant bits at zero, and

C is encoded on m'*k bits with m'*k-c most significant bits at zero.

Indeed, u words of k bits are sufficient to determine N with certainty. Similarly, m' words of k bits are sufficient to determine C with certainty.

The inventor proposes two types of modification:

using the register 16 m' times, i.e. carrying out only one $P_{field}$ operation in successively giving all the words of C, computing the error correction parameter H associated with this operation.

III.1—Method

Figure 5:
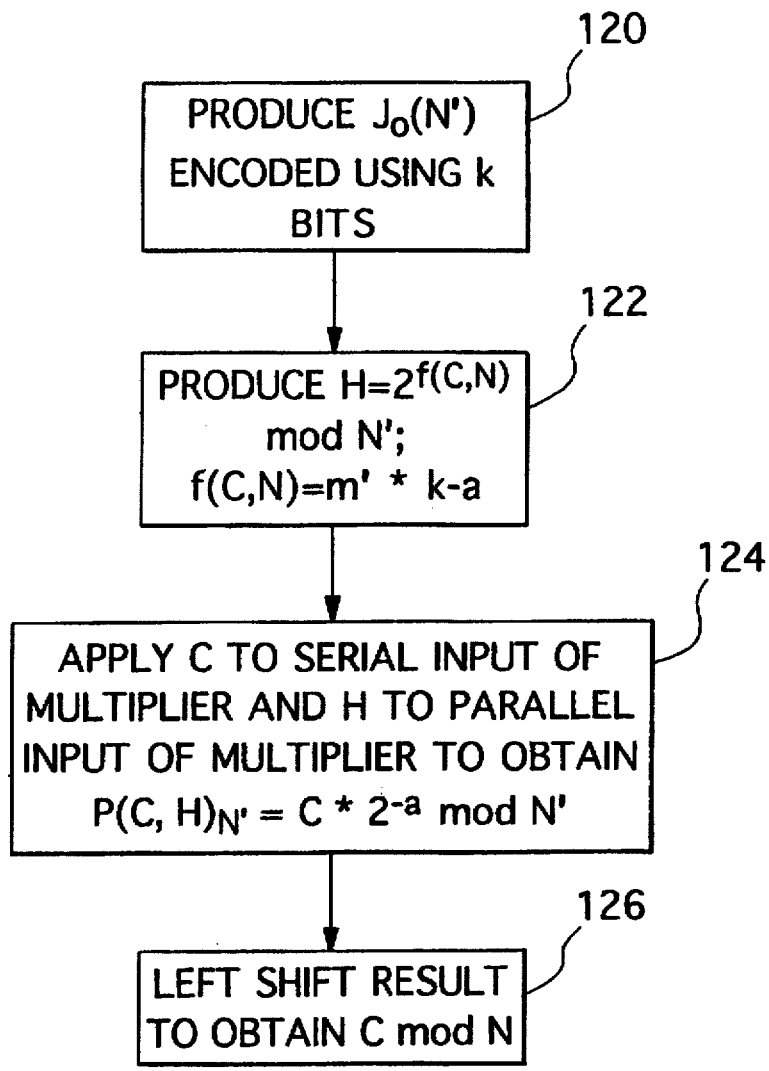
FIG. 5 is a flowchart describing the modular reduction method in yet another embodiment of the present invention.

It is enough to proceed in the following steps, shown in FIG. 5.

E0—production of $J_0(N')$ by means of the central processing unit (step 120),

E1—production of a binary data element $H=2^{m'*k-a}$ mod $N'=2^{f(C,N)}$ mod N' with $f(C,N)=m'*k-a$ by using the coprocessor (step 122), E3—the providing of C, encoded on m'*k bits, at the serial input of the multiplication circuit 19, and of H encoded on n bits, at the parallel input of this same multiplication circuit (step 124) to obtain $P(C,H)_{N'}=C*2^{-a}$ mod N'

E4—left shift of the result (step 126) by a bits to obtain $2^a*P(C,H)_{N'}=C$ mod N (this step could be performed in the central processing unit).

In practice, the useful size of H is smaller than or equal to the useful size of N', i.e. smaller than or equal to the size of N, and therefore smaller than or equal to n.

III.2—Production of the values of $C*2^{-a}$ mod N'

The following procedure will be followed:

R1—loading of the parameter H into the register 10 and of the modulo N' into the register 12, and initialization of the n-bit register 11 at zero, the contents of this register 11 being denoted S, with S as a variable binary data element encoded on n bits, R2—setting up of a loop, indexed by s, with s varying from 1 to m, each sth iteration comprising the following operations:

a) transfer of the $s^{th}$ word $C_{s-1}$ of C from the register 16 to the storage flip-flop 21, b) production of a value $X(s)=S(s-1)+H*C_{s-1}$ with $S(0)=0$ (n bits at zero) and S(s-1) as the so-called updated value of S, defined hereinafter, by:

I—making a right shift of the contents of the register 10 to the input of the serial-parallel multiplication circuit 19 with the looping of the output of the register 10 to its input, II—multiplying the bits of $H_i$ by $C_{s-1}$, III—making a right shift of the contents of the register 12, with looping of the output to the input, IV—determining the updated value of S(s-1) as being the value stored in the register 11 after the $(s-1)^{th}$ iteration if this updated value is smaller than N', and, if this updated value is greater than N', making a serial subtraction of N' from this updated value in the subtraction circuit 28, the value that results therefrom being the updated value of S(s-1), and V—making a right shift of the contents of the register 11 and carrying out a bit-by-bit addition of the value of the multiplication $H*C_{s-1}$ to the updated value of $S(s-1)$ in the addition circuit 30, c) multiplication of the least significant word of $X(s)$, $X_0(s)$ by $J_0$ in the multiplication circuit 20, and entering of the value $X_0(s)*J_0 \mod 2^k = Y_0(s)$ into the register 18, and, simultaneously, the delaying of N' and $X(s)$ by k cycles in the delay circuits 32 and 34, d) computation of a value $Z(s) = X(s) + Y_0(s)*N'$ by:
   I—multiplying $Y_0(s)$ by N', delayed by k cycles, in the second multiplication circuit 20, and
   II—adding $X(s)$ to the value $Y_0(s)*N'$ bit by bit in the addition circuit 31, e) not taking account of the least significant word of $Z(s)$ and storing the remaining words, namely $Z(s)/2^k$, in the register 11, f) comparing $Z(s)/2^k$ with N', bit by bit, in order to determine the updated value $S(s)$ of the next iteration in the manner described here above, this comparison being made by the bit-by-bit subtraction of $Z(s)/2^k$ and N' in the subtraction circuit 29, N' having been delayed by k additional cycles in the delay circuit 33, g) the $s^{th}$ word of C being loaded into the register 16 at any point in time during the above operations, R3—at the $m'^{th}$ iteration, ignoring the least significant word of $Z(m')$ and entering the remaining words, i.e. $Z(m')/2^k$, into the register 10, R4—output of the result stored in the register 10 at the last iteration, possibly subtracted from N' if need be, by means of the subtraction circuit 27, R5—left shift of the result by a bits.

The method described here above makes it possible to reduce the number of steps need to produce C mod N. The computation time is thus greatly reduced.

III.3—Production of $H = 2^{m'*k-a} \mod N'$

It is assumed that the useful size of N' is u words of k bits. The number of useful bits of N' is $l' = l - a$.

The operation is performed as follows:

H1—loading of the modulo N' into the register 12 and initialization of the register 10, the contents of the register 10 being denoted B(0) (n bits at 0), and initialization of the register 44 (namely, the production of a signal RES such that SC=0), H2—output of N' from the register 12 by right shifting, with looping to its input, of l-a bits with l-a as the number of useful bits of the modulo N', in order to have a most significant bit at 1 in the register 12, H3—production and storage of a data element $B(1) = 2*(B(0) - N")$, encoded on n bits, with $N" = N'*2^{n-l+a}$, N" corresponding to the binary data elements stored in the register 12, by:
   output of N" and B(0) by carrying out a right shift, in the registers 10 and 12, of the contents of these registers, the input of the register 10 being connected to the output of the subtraction circuit 27 and the input of the register 12 being connected to its output,
   bit-by-bit subtraction, in the subtraction circuit 27, as and when they make their exit, of the bits of N" and B(0), with the left shift by one unit of the result denoted $R(0) = B(0) - N"$,
   loading of the result of the subtraction after shifting, denoted $B(1) = 2*R(0)$, into the register 10,
   bit-by-bit subtraction in the subtraction circuit 40 of B(1) and N", to determine whether B(1) is $\geq$ or < N", and production by the circuit 44 of SC=0 if B(1) $\geq$ N", and of Sc=1 if B(1) < N", H4—production of a data element $H_{int} = 2_t \mod N"$, with $t = n - l + a + u*k + (m' - u)*k2^r$, with r as an integer such that $k/2^r$ is an integer, by:
   setting up of a loop indexed by an index i, with i as an integer from 1 to t-n, each $i^{th}$ iteration comprising the following operations:
   if B(i) < N" then loading into the register 10 of $B(i+1) = 2*(B(i) - 0) = 2*B(i)$, after the left shifting of B(i) by one unit and bit-by-bit comparison of B(i+1) and N",
   else, bit-by-bit subtraction of N" and B(i) with left shifting of the result by one unit and loading into the register 10 of $B(i+1) = 2*(B(i) - N")$, and bit-by-bit comparison of B(i+1) and N", H5—if B(t-n+1) $\geq$ N": bit-by-bit subtraction of B(t-l+1) and N" in the subtraction circuit 27, which gives $2*(B(t-n+1) - N")$ and loading of B(t-n+1) - N" into the register 10, which necessitates a right shift by one unit, H6—night shift by n-l+a bits in the registers 10 and 12. We then have N' in the register 12.

H7—production of the parameter H by the performance of r $P_{field}$ operations:
$H_{int}(j) = P(H_{int}(j-1), H_{int}(j-1))_{N'}$, with j as an index from 1 to r, and $H_{int}(0) = B(t-n+1)*2^{l-n-a}$ or $(B(t-n+1) - N")*2^{l-n-a}$.

$H_{int}(0)$ is in the register 10 after the shifting of the step H6.

We thus obtain $H_{int(r)} 2^{m'*k} \mod N'$.

H8—production of the parameter H by the performance of a $P_{field}$ operation:
$P(H_{int}(r), 2^{u*k-a}) N'$ with $H_{int}(r)$ given at the serial input of the multiplication circuit 19, and $2^{u*k-a}$ given to the parallel input of this same multiplication circuit.

We thus obtain $H = 2^{m'*k-a} \mod N'$.

It has of course been assumed that the r+1 $P_{field}$ operations have been performed in the same spirit as for the previously described method. This means that u words of k bits will be given at the parallel input of the multiplication circuit 19 for each operation.

IV—Modular reduction for an odd-parity modulo

Figure 6:
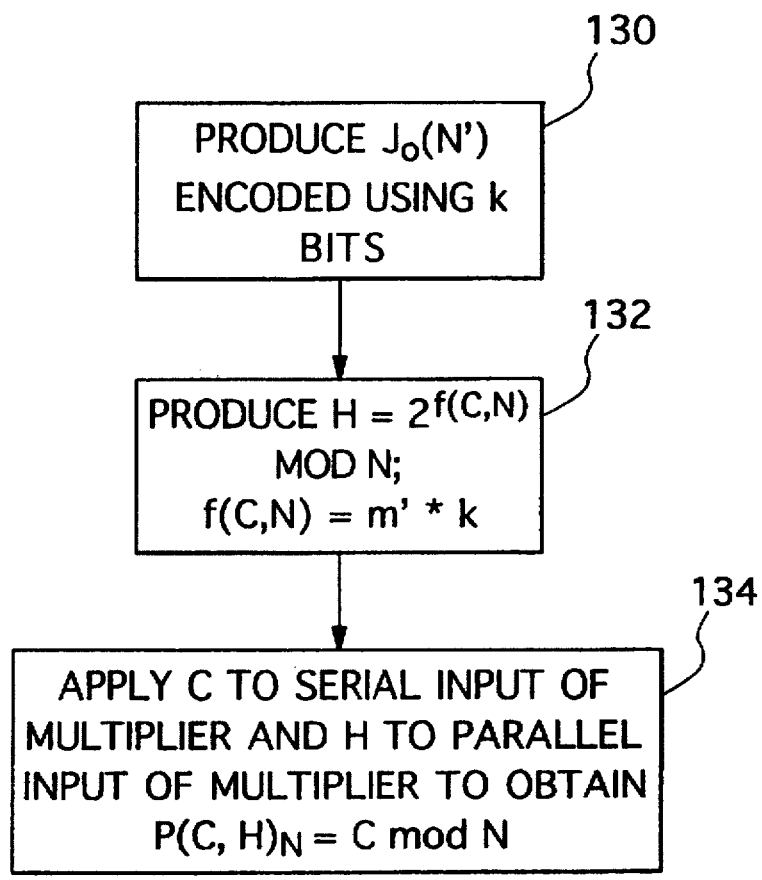
FIG. 6 is a flowchart describing another embodiment of the modular reduction method according to the invention.

The methods described here above in part III are adapted. It is enough to proceed as follows and as shown in FIG. 6:

compute $J_0(N)$, by means of the central processing unit (step 130)

compute $H = 2^{m'*k} \mod N = 2^{f(C, N)} \mod N$ with $f(C, N) = m'*k$, in using the coprocessor (step 132), provide C, encoded on m'*k bits, at the serial input of the multiplication circuit 19, and of H, encoded on n bits, at the parallel input of this same multiplication circuit 19 step (134) to obtain a $P(C, H)_N = C \mod N$.

In practice, the useful size of H is smaller than or equal to the useful size of N, i.e. smaller than or equal to the size of N, and therefore smaller than or equal to n.

IV.1—Production of C mod N

The following procedure will be followed:

R1—loading of the parameter H into the register 10 and of the modulo N into the register 12, and initialization of the n-bit register 11 at zero, the contents of this register 11 being denoted S, with S as a variable binary data element encoded on n bits, R2—setting up of a loop, indexed by i, with s varying from 1 to m', each $i^{th}$ iteration comprising the following operations:

a) transfer of the $s^{th}$ word $C_{s-1}$ of C from the register 16 to the storage flip-flop circuit 21, b) production of a value $X(s)=S(s-1)+H*C_{s-1}$ with $S(0)=0$ and $S(s-1)$ as the so-called updated value of S, defined hereinafter, by:

I—making a right shift of the contents of the register 10 to the input of the serial-parallel multiplication circuit 19 with the looping of the output of the register 10 to its input, II—multiplying the bits of H by $C_{s-1}$, III—making a right shift of the contents of the register 12, with looping of the output of this register to its input, IV—determining the updated value of $S(s-1)$ as being the value stored in the register 11 after the $(s-1)^{th}$ iteration if this updated value is smaller than N and, if this updated value is greater than N, making a serial subtraction of N from this updated value in the subtraction circuit 28, the value that results therefrom being the updated value of $S(s-1)$, and V—making a right shift of the contents of the register 11 and carrying out a bit-by-bit addition of the value of the multiplication $H*C_{s-1}$ to the updated value of $S(s-1)$ in the addition circuit 30, c) multiplication of the least significant word of $X(s)$, $X_0(s)$ by $J_0$ in the multiplication circuit 20, and entry of the value $X_0(s)*J_0 \bmod 2^k = Y_0(s)$ into the register 18, and simultaneously the delaying of N and $X(s)$ by k cycles in the delay circuits 32 and 34, d) computation of a value $Z(s)=X(s)+Y_0(s)*N$ by:

I—multiplying $Y_0(s)$ by N, delayed by k cycles, in the multiplication circuit 20, and II—adding $X(s)$ to the value $Y_0(s)*N$, bit by bit, in the addition circuit 31, e) not taking account of the least significant word of $Z(s)$ and storing the remaining words, namely $Z(s)/2^k$, in the register 11, f) comparing $Z(s)/2^k$ with N, bit by bit, in order to determine the updated value $S(s)$ of the next iteration in the manner described here above, this comparison being made by the bit-by-bit subtraction of $Z(s)/2^k$ and N in the subtraction circuit 29, N having been delayed by k additional cycles in the delay circuit 33, g) the $s^{th}$ word of C being loaded into the register 16 at any point in time during the above operations, R3—at the $m'^{th}$ iteration, ignoring the least significant word of $Z(m')$ and entering the remaining words, i.e. $Z(m')/2^k$, into the register 10, R4—output of the result stored in the register 10 at the last iteration, possibly subtracted from N if need be, by means of the subtraction circuit 27.

IV.2—Production of $H=2^{m'*k} \bmod N$

It is assumed that the useful size of N is u words of k bits.
The number of useful bits of N is 1.
The operation is performed as follows:

H1—loading of the modulo N into the register 12 and initialization of the register 10, the contents of the register 10 being denoted B(0) (n bits at 0), and initialization of the register 44 (namely, the production of a signal RES such that SC=0), H2—output of N' from the register 12 by right shifting, with looping to its input, of 1 bits with 1 as the number of useful bits of the modulo N, in order to have a most significant bit at 1 in the register 12, H3—production and storage of a data element $B(1)=2*(B(0)-N')$, encoded on n bits, with $N'=N*2^{n-1}$, N' corresponding to the binary data elements stored in the register 12 by:

output of N' and B(0) by right shifting in the registers 10 and 12 of the contents of these registers, the input of the register 10 being connected to the output of the subtraction circuit 27 and the input of the register 12 being connected to its output, bit-by-bit subtraction, in the subtraction circuit 27, as and when they make their exit, of the bits of N' and B(0), with the left shift by one unit of the result denoted $R(0)=B(0)-N'$, loading of the result of the subtraction after shifting, denoted $B(1)=2*R(0)$, in the register 10, bit-by-bit subtraction in the subtraction circuit 40 of B(1) and N', to determine whether B(1) is> or< than N', and production by the circuit 44 of SC=0 if $B(1)>N'$, and of Sc=1 if $B(1)<N'$, H4—production of a data element $H_{int}=2^t \bmod N'$, with $t=n-1+u*k+(m'-u)*k/2^r$, with r as an integer such that $k/2^r$ is an integer by:

setting tip of a loop indexed by an index i, with i as an integer from 1 to t-n, each $i^{th}$ iteration comprising the following operations:

if $B(i)<N'$, then loading into the register 10 of $B(i+1)=2*(B(i)-0)=2*B(i)$, after left shifting of B(i) by one unit and bit-by-bit comparison of B(i+1) and N', else, bit-by-bit subtraction of N' and B(i) with left shifting of the result by one unit and loading into the register 10 of $B(i+1)=2*(B(i)-N')$, and bit-by-bit comparison of B(i+1) and N', H5—if $B(t-n+1) \leq N'$: bit-by-bit subtraction of $B(t-n+1)$ and N' in the subtraction circuit 27, which gives $2*(B(t-n+1)-N')$ and loading of $B(t-n+1)-N'$ into the register 10, which necessitates a right shift by one unit, H6—right shift by n−1 bits in the registers 10 and 12. We then have N in the register 12.

H7—production of the parameter H by the performance of r $P_{field}$ operations:

$H_{int}(j)=P(H_{int}(j-1), H_{int}(j-1))_N$, with j as an index from 1 to r, and $H_{int}(0)=B(t-n+1)*2^{1-n}$ or $(B(t-n+1)-N'')*2^{1-n}$, $H_{int}(0)=2^{t'} \bmod N$, with $t'=u*k+(m'-u)*k/2^r$ $H_{int}(0)$ is in the register 10 after the shifting of the step H6.

We thus obtain $H_{int}(r)=H=2^{m'*k} \bmod N$.

It has of course been assumed that the r $P_{field}$ operations are performed in the same spirit as for the previously descried method. This means that u words of k bits will be given at the parallel input of the multiplication circuit 19 for each operation.

As compared with the prior art circuit, it is of course necessary to modify the sequencing circuit that produces the control signals needed for the working of the circuit illustrated in FIG. 1. Thus, it will be necessary in particular, for the last method described, to use a programmable counter firstly in order to manage the use of the register 16 as this register will be used a variable number of times. The use of this programmable counter will be necessary, secondly, to manage the shifts in the registers during the production of H as a function of the number of useful bits of the modulo N (or N' if N is an even-parity value).

In the circuit as it exists in the prior art, registers 10, 11 and 12 are used. These registers can be configured as registers of eight or sixteen 32-bit words. If it is desired to further reduce the computation time associated with a modular operation, it is possible to use registers that can be configured as registers of one to sixteen 32-bit words. In other words, it is possible in practice to choose m=u. To do this, it is enough to add on supplementary multiplexers in the computation circuit at the registers 10, 11 and 12. This will make it possible, admittedly to the detriment of space availability, to reduce the time needed for shifts in the registers 10, 11 and 12.

One advantage of being able to carry out modular reductions with an even-parity or odd-parity modulo can be applied to particular advantage for the implementation of RSA type encryption.

RSA method

The RSA encryption method requires the performance of computations of the $C=M^D \bmod N$ type with M as a message to be encrypted or decrypted, N as a modulo such that $N=P*Q$, with P and Q as prime numbers and D such that $D*E=1 \bmod ((P-1)*(Q-1))$, with E being known.

One algorithm to perform this computation is the following:

---

$A = (M \bmod P)^D \bmod (P - 1) \bmod P$
$B = (M \bmod Q)^D \bmod (Q - 1) \bmod Q$
$U = Q^{-1} \bmod P$
If $A < B \bmod P$ then
$C = (((A + P - (B \bmod P)) * U) \bmod P) * Q + B$
Else
$C = (((A - (B \bmod P)) * U) \bmod P) * Q + B$
This algorithm notably implements:

two modular reductions,
two modular exponentiation operations,
one modular multiplication.
The invention can be implemented to compute:

$D \bmod (P - 1)$ and $D \bmod (Q - 1)$, $P - 1$ and $Q - 1$ being even-parity numbers,
$M \bmod P$ and $M \bmod Q$, P and Q being odd-parity numbers.

---

Search for prime numbers

The RSA method described here above calls for the determining of two prime numbers P and Q. To prevent an excessively easy a posteriori determining of these numbers, it is desirable to choose very great numbers, for example numbers encoded on 256 bits.

A known method of choosing very great prime numbers consists in choosing a number randomly and determining the greatest common divisor (gcd) of this number and of the result of the multiplication of a large number of the first prime numbers (for example one hundred of the first prime numbers). This technique calls for the performance of division operations and the circuit 1 is therefore not suited to its implementation.

The inventor proposes another method. No longer is the gcd of the randomly chosen number and of the product of the first hundred (for example) prime numbers computed. Rather, what is done is to successively carry out the modular reduction of the random number with each of the first hundred prime numbers.

This method cannot be envisaged in practice unless the time needed to implement a modular reduction is reduced. The invention can be used to envisage the implementation of this method through the gain in time achieved with the new methods of computation of error correction and modular reduction developed in part III. It is useful here to configure the registers with one k-bit word (for example k=32).

Furthermore, in the prior art, registers of 256 or 512 bits only are used. In practice this means that, in order that the operations may be performed in a reasonable amount of time, it is necessary to choose prime numbers encoded on one and the same number of bits. This therefore raises a problem of security with respect to attempts by unauthorized individuals to determine these numbers.

The inventor therefore proposes to modify the registers used, for example by choosing registers that can be modulated and that may comprise, as desired, 32, 256, (256+n), 384, (384+n), 512, or (512+n) cells with n as an integer. For example, the value taken will be n=32.

The trend is to the choice of modulo values encoded on 512, 768 and 1024 bits.

The choice of registers that can be modulated such as those defined here above provides for the following:

in the general context of modular operations, the minimizing of the number of shifts in the registers by adaptation with greater flexibility to the useful sizes of the data processed, in the more particular context of the implementation of RSA encoding, the ability to choose different sizes for P and Q. For example, if it is desired to have a modulo $N=P*Q$ encoded on 512 bits, it is possible for example to choose P on 254 bits and Q on 258 bits. A 256-cell register will be used for the computations relating to P and register of 256+n=288 cells will be used for computations relating to Q. With the prior art circuit, it would have been necessary to use a 512-cell register for the computations relating to Q. This would have been detrimental as regards the time taken to perform the computations.

The invention is particularly advantageous inasmuch as it can be implemented (as regards methods) without modifying the existing circuits shown in FIGS. 1 and 2. All that is modified is the sequencing operation enabling the production of the different control signals necessary for the functioning of these circuits. In particular, the invention entails taking account of the useful sizes of the modulo N and of the operands. Advantageously, the methods of the invention will be used by the modification, as indicated here above, of the circuit 1.

It has been assumed in FIG. 2 that resources of the circuit of FIG. 2 are used. This enables the overall size of the coprocessor to be reduced to the minimum. Of course, it is possible to use a circuit dedicated solely to the computation of H.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method for implementing modular reduction according to the Montgomery method, using a multiplication circuit having a serial input, a parallel input and a serial output, the method comprising the steps of:

encoding a binary data element C using a number c of bits, grouped together in m' words of k bits, with m' and k as integers, wherein $m'*k \geq c > (m'-1)*k$;

encoding a non-zero binary data element N using a number n of bits;

producing a value $C \bmod N$ by modular reduction including the steps of:

producing at least one binary data element $J_0$, such that $J_0 = -N_0 \bmod 2^k$, wherein $N_0$ is associated with N;

producing at least one binary data element H having the form $2^{f(C,N)}$, wherein $f(C,N)$ is an integer representing the size of C and the parity of N;

applying the binary data element C and the binary element H to the inputs of the multiplication circuit to obtain at the serial output the value C mod N.

2. The method of claim 1, wherein the least significant bit of N is equal to 0,
   wherein the step of producing the binary data element $J_0$ includes the step of producing a binary data element $J_0(N')$, with N' as a binary data element encoded on n bits such that N' has one least significant bit at 1 and $N=N'*2^a$, with a as an integer>1;
   wherein the step of producing the binary data element H includes the step of producing of a binary data element $H=2^{m'*k-a} \mod N'$;
   wherein the step of applying includes the steps of applying the binary data element C, encoded using m'*k bits, at the parallel input of the multiplication circuit, and of applying the binary data element H encoded using n bits at the serial input of the multiplication circuit to obtain a data element $P(C, H)_{N'}=C*2^{-a} \mod N'$; and
   further comprising the step of producing $2^{a*} P(C, H)_{N'}$ to produce the value C mod N.

3. A method of claim 2 wherein the step of applying comprises the steps of:
   loading the binary data element H into a first register;
   loading the modulo N' into a second register
   initializing a variable binary data element S, encoded on n bits, to zero and storing the value S in a third register;
   for each integer s, wherein s is varied from 1 to m', performing the steps of:
   1. transferring the $s^{th}$ word $C_{s-1}$ of C from a fourth register to the parallel input of the multiplication circuit;
   2. producing a value $X(s)=S(s-1)+H*C_{s-1}$, wherein $S(0)=0$ and $S(s-1)$ is the value of S at the current iteration, by
      a. right shifting contents of the first register to the input of the multiplication circuit, while connecting an output of the first register to a serial input of the first register;
      b. multiplying the bits of H by $C_{s-1}$;
      c. right shifting contents of the second register to the input of the multiplication circuit, while connecting an output of the second register to a serial input of the second register;
      d. determining an updated value of $S(s-1)$ as the value stored in the third register after the $(s-1)^{th}$ iteration if the updated value is smaller than N' and, if the updated value is greater than N, making a serial subtraction of N' from the updated value; and
      e. right shifting contents of the third register and performing bit-by-bit addition of the value of the multiplication $H*C_{s-1}$ to the updated value of $S(s-1)$,
   3. multiplying the least significant word of $X(s)$, $X_0(s)$ by $J_0$, and entering the value $X_0(s)*J_0 \mod 2^k=Y_0(s)$ into a fourth register, and simultaneously delaying N' and $X(s)$ by k cycles,
   4. computing a value $Z(s)=X(s)+Y_0(s)*N'$ by multiplying $Y_0(s)$ by N', delayed by k cycles; and by performing bit-by-bit addition of $X(s)$ to the value $Y_0(s)*N'$;
   5. dropping the least significant word of $Z(s)$ and storing the remaining words $Z(s)/2^k$ in the third register,
   6. comparing $Z(s)/2^k$ with N', bit by bit, to determine the updated value $S(s)$ of the next iteration by performing bit-by-bit subtraction of $Z(s)/2^k$ and N', N' having been delayed by k additional cycles,
   7. loading the $s^{th}$ word of C into the fourth register;
   at the $m'^{th}$ iteration, dropping the least significant word of $Z(m')$ and entering the remaining words $Z(m')/2k$ into the first register;
   outputting the result stored in the first register at the last iteration; and
   shifting of the result left by a bits.

4. The method of claim 2, wherein the step of producing the binary data element H comprises the steps of:
   loading modulo N' into a first register;
   initializing a value $B(0)$ and loading the value $B(0)$ into a second register,
   outputting N' from the first register by right shifting, and looping an output of the first register to its input, of 1–a bits, wherein 1 is the number of useful bits of N,
   producing and storing a data element $B(1)=2*(B(0)-N'')$, encoded on n bits, with $N''=N'*2^{n-1+a}$, by the step of:
   1. outputting N'' and $B(0)$ by right shifting the first and second registers, the input of the first register being connected to its output,
   2. bit-by-bit subtraction of the bits of N'' and $B(0)$, and left shifting, by one unit, the result denoted $R(0)=B(0)-N''$;
   3. loading of the result of the subtraction after shifting, denoted $B(1)=2*R(0)$, into the second register;
   4. bit-by-bit subtraction of $B(1)$ and N'' to determine whether $B(1)$ is $\geq$ or $<$ N'',
   producing of a data element $H_{int}=2^t \mod N''$, with $t=n-1+a+u*k+(m'-u)*k/2^r$, with r as an integer such that $k/2^r$ is an integer, and u as a non-zero integer such that $u*k \geq 1 > (u-1)*k$, by, for each integer i, wherein i is an integer from 1 to t–n, performing the steps of:
   1. loading, when $B(i)<N''$, $B(i+1)=2*(B(i)-0)=2*B(i)$ into the second register, after left shifting of $B(i)$ by one unit and bit-by-bit comparison of $B(i+1)$ and N'';
   2. when $B(i)=>N''$, bit-by-bit subtraction of N'' and $B(i)$ with left shifting of the result by one unit and loading into the second register of $B(i+1)=2*(B(i)-N'')$, and bit-by-bit comparison of $B(i+1)$ and N'';
   when $B(t-n+1) \geq N''$, bit-by-bit subtraction of $B(t-n+1)$ and N'', and loading of $B(t-n+1)-N''$ into the second register;
   right shifting the contents of the first and second registers by n–1+a bits;
   performing r $P_{field}$ operations $H_{int}(j)=P(H_{int}(j-1), H_{int}(j-1))_{N'}$, with j as an index from 1 to r, and $H_{int}(0)=B(t-n+1)*2^{1-n-a}$ or $(B(t-n+1)-N'')*2^{1-n-a}$;
   producing the parameter H by the performance of a $P_{field}$ operation $H=P(H_{int}(r), 2^{u*k-a})N'$.

5. The method of claim 1, wherein
   the step of producing the binary data element J includes the step of producing a binary data element $J_0(N)$;
   the step of producing the binary data element H includes the step of producing a binary data element $H=2^{m'*k} \mod N$; and
   the step of applying the binary data element C and the binary element H to the inputs of the multiplication circuit includes the step of applying the binary data element C, encoded on m'*k bits, to the serial input of the multiplication circuit, and applying the binary data element H, encoded on n bits, to the parallel input of the multiplication circuit to obtain a value $P(C, H)_N$ to provide the value C mod N.

6. The method of claim 5, wherein the step of applying the binary data element C and the binary element H to the inputs of the multiplication circuit comprises the steps of:
   loading the binary data element H into a first register;
   loading the modulo N' into a second register
   initializing a variable binary data element S to zero and loading S in a third register;
   for each integer s, with s varying from 1 to m', performing the steps of:
   1. transferring the $s^{th}$ word $C_{s-1}$ of C from a fourth register to the parallel input of the multiplication circuit;
   2. producing a value $X(s)=S(s-1)+H*C_{s-1}$ with $S(0)=0$ and $S(s-1)$ as an updated value of S, by the steps of:
      a. right slifting the contents of the first register to the serial input of the multiplication circuit, and looping the output of the first register to an input of the first register;
      b. multiplying the bits of H by $C_s-1$;
      c. right shifting the contents of the second register, and looping the output of the second register to an input of the second register;
      d. determining the updated value of $S(s-1)$ as the value stored in the third register after the $(s-1)^{th}$ iteration if the updated value is smaller than N, and, if the updated value is greater than N, making a serial subtraction of N from the updated value, the value that results therefrom being the updated value of $S(s-1)$; and
      e. right shifting the contents of the third register and carrying out a bit-by-bit addition of the value of the multiplication $H*C_{s-1}$ to the updated value of $S(s-1)$;
   3. multiplying the least significant word of $X(s)$, $X_0(s)$ by $J_0$ and entering of the value $X_0(s)*J_0 \mod 2^k = Y_0(s)$ into a fourth register, and, simultaneously, the delaying of N and $X(s)$ by k cycles;
   4. computing a value $Z(s)=X(s)+Y_0(s)*N$ by multiplying $Y_0(s)$ by N, delayed by k cycles and adding $X(s)$ bit by bit to the value $Y_0(s) * N;e$), while dropping the least significant word of $Z(s)$ and storing the remaining words $Z(s)/2^k$ in the third register;
   5. comparing $Z(s)/2^k$ with N, bit by bit, in order to determine the updated value $S(s)$ of the next iteration by performing a bit-by-bit subtraction of $Z(s)/2^k$ and N, N having been delayed by k additional cycles;
   6. loading the $s^{th}$ word of C into the fourth register;
   at the $m'^{th}$ iteration, dropping the least significant word of $Z(m')$ and entering the remaining words $Z(m')/2^k$ into the first register; and
   outputting the result stored in the first register at the last iteration.

7. The method of claim 5, wherein the step of producing the binary data element H comprises the steps of:
   loading the modulo N into a first register;
   initializing a value $B(0)$ and loading $B(0)$ into a second register;
   outputting N from the first register by right shifting, and looping 1 bits to the input of the first register, wherein 1 is the number of useful bits of N;
   producing and storing a data element $B(1)=2*(B(0)-N')$, encoded on n bits, with $N'=N*2^{n-l}$, by the steps of:
   1. outputting N'cud B(0) by right shifting the first and second registers, wherein the input of the first register is connected to the output of the first register,
   2. bit-by-bit subtraction of the bits of N'and $B(0)$, and left shifting, by one unit, the result denoted $R(0)=B(0)-N'$,
   3. loading the result of the subtraction after shifting, denoted $B(1)=2*R(0)$, into the second register,
   4. bit-by-bit subtraction of $B(1)$ and N', to determine whether $B(1)$ is $\geq$ or $<N'$;
   producing a data element $H_{int}=2_t \mod N'$, with $t=n-1+u*k+(m-u)*k/2^r$, with r as an integer such that $k/2^r$ is an integer and u is a non-zero integer such that $u*k>1>(u-1)*k$, by, for each integer i, wherein i is an integer from 1 to t-n, performing the steps of:
   1. when $B(i)<N'$, loading $B(i+1)=2*(B(i)-0)=2*B(i)$ into the second register, after left shifting $B(i)$ by one unit and bit-by-bit comparison of $B(i-1)$ and N';
   2. when $B(i) \to N'$, bit-by-bit subtracting N'and $B(i)$, with left shifting of the result by one unit and loading in the second register of $B(i+1)=2*(B(i)-N')$, and bit-by-bit comparison of $B(i+1)$ and N';
   when $B(t-n+1) \geq N'$, performing bit-by-bit subtraction of $B(t-n+1)$ and N' and loading of $B(t-n+1)-N'$ in the second register;
   right shifting, by n−1bits, the first and second registers; and
   producing the parameter H by performing r $P_{field}$ operations $H_{int}(j)=P(H_{int}(j-1), (H_{int}(j-1))_{N'}$, with j as an index from 1 to r, and $H_{int}(0)=B(t-n+1)*2^{l-n}$ or $(B(t-n+1)-N')*2^{l-n}$.

8. The method of claim 1, wherein the least significant bit of N is equal to 0, and
   wherein the step of producing the binary data element J includes the step of producing a binary data element $J_0(N')$, wherein N' is a binary data element encoded on n bits such that N' has one least significant bit at 1 and $N=N'*2^a$, wherein a is an integer$>1$,
   wherein the steps of producing the binary data element H and applying the binary data element C and the binary element H to the inputs of the multiplication circuit, comprises the steps of:
   for each integer i, wherein i is varied from 1 to m"−1, wherein m" is an integer such that $m"+m \geq m'>(m"-1)*m$, wherein m is such that $n=m*k$, performing the steps of:
      producing a binary data element $H_i=2^{(i-1)*n-a} \mod N'$ encoded on n bits,
      producing a binary data element $C_i$ such that $C=\sigma_i C_i*2^{1*n}$,
      applying the binary data element Hi at the serial input of the multiplication circuit aid the binary data element $C_i$ to the parallel input of the multiplication circuit, to obtain a result $P(C_i, H_i)_{N'}=C*2^{i*n-a} \mod N'$, and
      shifting the result to obtain a value $C_i*2^{i*n} \mod N$ and storing the value, for $i=0$, storing $C_0$ when $C_0<N$ and storing $C_0-N$ when $C_0>N$; and performing modular addition of stored values $C_i*2^{i*n} \mod N$ to provide a value C mod N.

9. The method of claim 8, wherein the step of producing the binary data element $H_i$ comprises the steps of:
   producing $H_1=2^{2*n-a} \mod N'$by, for each integer $i>1$, performing the steps of:
      producing $H_{i,p(i)}=2^{2*exp(p(i))*(n-a)} \mod N'$ with $p(i)=Ent[\log_2(i*n/(n-a))]+1$, wherein Ent is the "integer part" operator;
      when $r>n$, producing $2^{n-r} \mod N'$;
      applying $H_{i,p(i)}$ when $n-r \geq 0$ and $2^{n-r} \mod N'$ when $n-r<0$, encoded on n bits, to the serial input of the multiplication circuit and, in parallel, applying $2^{n-r}$ when n−r>0 and $H_{i,p(i)}$ when n−r<0, encoded on n bits, to the parallel input of the multiplication circuit.

10. The method of claim 1, wherein the least significant bit of N is equal to 0, and
wherein the step of producing the binary data element J includes the step of producing a binary data element $J_0(N')$, wherein N' is a binary data element encoded on n bits such that N' has one least significant bit at 1 and $N=N'*2^a$, wherein a is an integer>1,
wherein the steps of producing the binary data element H and applying the binary data element C and the binary element H to the inputs of the multiplication circuit, comprises the steps of:
for each integer i, wherein i is varied from 1 to w−1, wherein w is an integer such that $w*1 \geq c > (w-1)*1$, wherein 1 is a number of useful bits of N, performing the steps of:
producing a binary data element $H_i=2^{n+i*1-a}$ mod N' encoded on n bits;
producing a binary data element $C_i$ such that $C=\Sigma_i C_i*2^{i*1}$;
applying the binary data element $H_i$ to the serial input of the multiplication circuit and the binary data element $C_i$ to the parallel input of the multiplication circuit, to obtain a result $P(C_i, H_i)_{N'}=C_i*2^{i*1-a}$ mod N' at the serial output of the multiplication circuit,
shifting the result to obtain a value $C_i*2^{i*1}$ mod N and storing the value; for i=0, storing $C_0$ when $C_0<N$ and storing $C_0-N$ when $C_0>N$; performing modular addition of stored values $C_i*2^{i*1}$ mod N to provide a value C mod N.

11. The method of claim 10, wherein the step of producing the binary data element $H_i$ comprises the steps of:
producing of $H_1=2^{n+1-a}$ mod N' by, for each integer i>1, performing the steps of:
producing $H_{i,p(i)}=2^{n-2exp(p(i))*(1-a)}$ mod N' with p(i)= Ent[$\log_2(i*1/(1-a))$]+1, wherein Ent designates an "integer part" operator;
when r>n, producing $2^{n-r}$ mod N'; and
applying $H_{i,p(i)}$ when n−r≥0 and $2^{n-r}$ mod N' when n−r<0, encoded on n bits, to the serial input of the multiplication circuit and, in parallel, applying $2^{n-r}$ when n−r>0 and $H_{i,p(i)}$ when n−r<0, encoded on n bits, to the parallel input of the multiplication circuit.

12. A method for implementing modular reduction according to the Montgomery method, using a multiplication circuit having a serial input, a parallel input and a serial output, the method comprising the steps of:
encoding a binary data element C using a number c of bits, grouped together in m' words of k bits, with m' and k as integers, wherein $m'*k \geq c > (m'-1)*k$;
encoding a non-zero binary data element N using a number n of bits, wherein the least significant bit of N is equal to 0;
producing a value C mod N, by the steps of:
producing a binary data element $J_0(N')$, wherein N' is a binary data element encoded on n bits such that N' has one least significant bit at 1 and $N=N'*2^a$, wherein a is an integer≥1;
producing of at least one binary data element H having the form $2^{f(C,N)}$ mod N', wherein f(C,N) is an integer representing the size of C and the parity of N and is equal to m'*k−a;
applying the binary data element C, encoded using m'*k bits, to the parallel input of the multiplication circuit, and the binary data element H, encoded using n bits at the serial input of the multiplication circuit, to obtain a data element $P(C, H)_{N'}=C*2^{-a}$ mod N'; and
computing $2^a*P(C,H)_{N'}$ to produce the value C mod N.

13. A method of claim 12 wherein the step of applying comprises the steps of:
loading the binary data element H into a first register;
loading the modulo N' into a second register initializing a variable binary data element S, encoded on n bits, to zero and storing the value S in a third register;
for each integer s, wherein s is varied from 1 to m', performing the steps of:
1. transferring the $s^{th}$ word $C_{s-1}$ of C from a fourth register to the parallel input of the multiplication circuit;
2. producing a value $X(s)=S(s-1)+H*C_{s-1}$, wherein S(0)=0 and S(s−1) is the value of S at the current iteration, by
 a. right shifting contents of the first register to the input of the multiplication circuit, while connecting an output of the first register to a serial input of the first register;
 b. multiplying the bits of H by $C_{s-1}$;
 c. right shifting contents of the second register to the input of the multiplication circuit, while connecting an output of the second register to a serial input of the second register;
 d. determining an updated value of S(s−1) as the value stored in the third register after the $(s-1)^{th}$ iteration if the updated value is smaller than N' and, if the updated value is greater than N, making a serial subtraction of N' from the updated value; and
 e. right shifting contents of the third register and performing bit-by-bit addition of the value of the multiplication $H*C_{s-1}$ to the updated value of S(s−1),
3. multiplying the least significant word of X(s), $X_0(s)$ by $J_0$, and entering the value $X_0(s)*J_0$ mod $2^k=Y_0(s)$ into a fourth register, and simultaneously delaying N' and X(s) by k cycles,
4. computing a value $Z(s)=X(s)+Y_0(s)*N'$ by multiplying $Y_0(s)$ by N', delayed by k cycles; and by performing bit-by-bit addition of X(s) to the value $Y_0(s)*N'$;
5. dropping the least significant word of Z(s) and storing the remaining words $Z(s)/2^k$ in the third register,
6. comparing $Z(s)/2^k$ with N', bit by bit, to determine the updated value S(s) of the next iteration by performing bit-by-bit subtraction of $Z(s)/2^k$ and N', N' having been delayed by k additional cycles,
7. loading the $s^{th}$ word of C into the fourth register;
at the $m'^{th}$ iteration, dropping the least significant word of Z(m') and entering the remaining words Z(m')/2k into the first register;
outputting the result stored in the first register at the last iteration; and
shifting of the result left by a bits.

14. The method of claim 12, wherein the step of producing the binary data element H comprises the steps of:
loading modulo N' into a first register;
initializing a value B(0) and loading the value B(0) into a second register;
outputting N' from the first register by right shifting, and looping an output of the first register to its input, of 1−a bits, wherein 1 is the number of useful bits of N, producing and storing a data element $B(1)=2*(B(0)-N")$, encoded on n bits, with $N"=N"*2^{n-1+a}$, by the steps of:

1. outputting N" and B(0) by right shifting the first and second registers, the input of the first register being connected to its output,
2. bit-by-bit subtraction of the bits of N" and B(0), and left shifting, by one unit, the result denoted $R(0)=B(0)-N"$;
3. loading of the result of the subtraction after shifting, denoted $B(1)=2*R(0)$, into the second register;
4. bit-by-bit subtraction of B(1) and N" to determine whether B(1) is $\geq$ or $<N"$, producing of a data element $H_{int}=2^t$ mod N", with $t=n-1+a+u*k+(m'-u)*k/2^r$, with r as an integer such that $k/2^r$ is an integer, and u as a non-zero integer such that $u*k \geq 1 > (u-1)$ k, by, for each integer i, wherein i is an integer from 1 to t-n, performing the steps of:

1. loading, when $B(i)<N"$, $B(i+1)=2*B(i)-0)=2*B(i)$ into the second register, after left shifting of B(i) by one unit and bit-by-bit comparison of B(i+1) and N";
2. when $B(i) \rightarrow N"$, bit-by-bit subtraction of N" and B(i) with left shifting of the result by one unit and loading into the second register of $B(i+1)=2*(B(i)-N")$, and bit-by-bit comparison of B(i+1) and N";

when $B(t-n+1) \geq N"$, bit-by-bit subtraction of B(t-n+1) and N", and loading of $B(t-n+1)-N"$ into the second register;

right shifting the contents of the first and second registers by n-1+a bits;

performing r $P_{field}$ operations $H_{int}(j)=P(H_{int}(j-1), H_{int}(j-1))_{N'}$, with j as an index from 1 to r, and $H_{int}(0)=B(t-n+1)*2^{l-n-a}$ or $(B(t-n+1)-N")*2^{l-n-a}$;

producing the parameter H by the performance of a $P_{field}$ operation $H=P(H_{int}(r), 2^{u*k-a})N'$.

15. A method for implementing modular reduction according to the Montgomery method, using a multiplication circuit having a serial input, a parallel input and a serial output, the method comprising the steps of:

encoding a binary data element C using a number c of bits, grouped together in m' words of k bits, with m' and k as integers, wherein $m'*k \geq c > (m'-1)$ k;

encoding a non-zero binary data element N using a number n of bits;

producing a value C mod N, by the steps of:
producing at least one binary data element $J_0(N)$;
producing at least one binary data element H having the form $2^{f(C,N)}$ mod N, wherein f(C,N) is an integer representing the size of C and the parity of N and is equal to $m'*k$;
applying the binary data element C, encoded on $m'*k$ bits, to the serial input of the multiplication circuit, and the binary data element H, encoded on n bits, to the parallel input of the multiplication circuit to obtain $P(C, H)_N$ at the serial output as the value C mod N.

16. The method of claim 15, wherein the step of applying the binary data element C and the binary element H to the inputs of the multiplication circuit comprises the steps of:

loading the binary data element H into a first register;
loading the modulo N' into a second register
initializing a variable binary data element S to zero and loading S in a third register;
for each integer s, with s varying from 1 to m', performing the steps of:
1. transferring the $s^{th}$ word $C_{s-1}$ of C from a fourth register to the parallel input of the multiplication circuit;

2. producing a value $X(s)=S(s-1)+H*C_{s-1}$ with $S(0)=0$ and S(s-1) as an updated value of S, by the steps of:
a. right shifting the contents of the first register to the serial input of the multiplication circuit, and looping the output of the first register to an input of the first register;
b. multiplying the bits of H by $C_{s-1}$;
c. right shifting the contents of the second register, and looping the output of the second register to an input of the second register;
d. determining the updated value of S(s-1) as the value stored in the third register after the $(s-1)^{th}$ iteration if the updated value is smaller than N, and, if the updated value is greater than N, making a serial subtraction of N from the updated value, the value that results therefrom being the updated value of S(s-1); and
e. right shifting the contents of the third register and carrying out a bit-by-bit addition of the value of the multiplication $H*C_{s-1}$ to the updated value of S(s-1);
3. multiplying the least significant word of X(s), $X_0(s)$ by $J_0$ and entering of the value $X_0(s)*J_0$ mod $2^k=Y_0(s)$ into a fourth register, and, simultaneously, the delaying of N and X(s) by k cycles;
4. computing a value $Z(s)=X(s)+Y_0(s)*N$ by multiplying $Y_0(s)$ by N, delayed by k cycles and adding X(s) bit by bit to the value $Y_0(s)*N$;e), while dropping the least significant word of Z(s) and storing the remaining words $Z(s)/2^k$ in the third register;
5. comparing $Z(s)/2^k$ with N, bit by bit, in order to determine the updated value S(s) of the next iteration by performing a bit-by-bit subtraction of $Z(s)/2^k$ and, N having been delayed by k additional cycles;
6. loading the $s^{th}$ word of C into the fourth register;

at the $m'^{th}$ iteration, dropping the least significant word of Z(m') and entering the remaining words $Z(m')/2^k$ into the first register; and outputting the result stored in the first register at the last iteration.

17. The method of claim 16, wherein the step of producing the binary data element H comprises the steps of:

loading the modulo N into a first register;
initializing a value B(0) and loading B(0) into a second register;
outputting N from the first register by right shifting, and looping 1 bits to the input of the first register, wherein 1 is the number of useful bits of N;
producing and storing a data element $B(1)=2*(B(0)-N')$, encoded on n bits, with $N'=N*2^{n-1}$, by the steps of:

1. outputting N' and B(0) by right shifting the first and second registers, wherein the input of the first register is connected to the output of the first register.
2. bit-by-bit subtraction of the bits of N' and B(0), and left shifting, by one unit, the result denoted $R(0)=B(0)-N'$,
3. loading the result of the subtraction after shifting, denoted $B(1)=2*R(0)$, into the second register,
4. bit-by-bit subtraction of B(1) and N', to determine whether B(1) is $\geq$ or $<N'$;

producing a data element $H_{int}=2^t$ mod N', with $t=n-1+u*k+(m'-u)*k/2^r$, with r as an integer such that $k/2^r$ is an integer and u is a non-zero integer such that $u*k>1>(u-1)*k$, by, for each integer i, wherein i is an integer from 1 to t-n, performing the steps of:

1. when $B(i)<N'$, loading $B(i+1)=2*(B(i)-0)=2*B(i)$ into the second register, after left shifting B(i) by one unit and bit-by-bit comparison of B(i+1) and N';

2. when B(i)→N', bit-by-bit substring N' and B(i), with left shifting of the result by one unit and loading in the second register of B(i+1)=2*(B(i) −N'), and bit-by-bit comparison of B(i+1) and N';

when B(t−n+1)≧N', performing bit-by-bit subtraction of B(t−n+1) and N' and loading of B(t−n+1)−N' in the second register;

right shifting, by n−1 bits, the first and second registers; and producing the parameter H by performing r $P_{field}$ operations $H_{int}(j)=P(H_{int}(j-1), H_{int}(j-1))_{N'}$, with j as an index from 1 to r, and $H_{int}(0)=B(t-n+1)*2^{1-n}$ or $(B(t-n+1)-N')*2^{1-n}$.

18. A method for implementing modular reduction according to the Montgomery method, using a multiplication circuit having a serial input, a parallel input and a serial output, the method comprising the steps of:

encoding a binary data element C using a number c of bits, grouped together in m' words of k bits, with m' and k as integers, wherein m'*k≧c>(m'−1)*k;

encoding a non-zero binary data element N using a number n of bits, wherein the least significant bit of N is equal to 0;

producing at least one binary data element $J_0(N')$, associated with N, wherein N' is a binary data element encoded on n bits such that N' has one least significant bit at 1 and $N=N'*2^a$, wherein a is an integer≧1;

for each integer i, wherein i is varied from 1 to m"−1, wherein m" is an integer such that m"+m≧m'>(m"−1)*m, wherein m is such that n=m*k, performing the steps of:

producing a binary data element $H_i=2^{(i+1)*n-a}$ mod N' encoded on n bits, producing a binary data element C, such that $C=\sigma_i C_i*2^{i*n}$, applying the binary data element $H_i$ at the serial input of the multiplication circuit and the binary data element $C_i$ to the parallel input of the multiplication circuit, to obtain a result $P(C_i, H_i)_{N'}=C_i*2^{i*n-a}$, mod N', and shifting the result to obtain a value $C_i*2^{i*n}$ mod N and storing the value, for i=0, storing $C_0$ when $C_0<N$ and storing $C_0-N$ when $C_0>N$; and performing modular addition of stored values $C_i*2^{i*n}$ mod N to provide a value C mod N.

19. The method of claim 18, wherein the step of producing the binary data element $H_i$ comprises the steps of:

producing $H_i=2^{2*n-a}$ mod N' by, for each integer i>1, performing the steps of:

producing $H_{i,p(i)}=2^{n+2exp(p(i))*(n-a)}$ mod N' with p(i)=Ent[$\log_2(i*n(n-a))$]+1, wherein Ent is the "integer part" operator;

when r>n, producing $2^{n-r}$ mod N';

applying $H_{i,p(i)}$ when n−r≧0 and $2^{n-r}$ mod N' when n−r<0, encoded on n bits, to the serial input of the multiplication circuit and, in parallel, applying $2^{n-r}$ when n−r>0 and $H_{i,p(i)}$ when n−r<0, encoded on n bits, to the parallel input of the multiplication circuit.

20. A method for implementing modular reduction according to the Montgomery method, using a multiplication circuit having a serial input, a parallel input and a serial output, the method comprising the steps of:

encoding a binary data element C using a number c of bits, grouped together in m' words of k bits, with m' and k as integers, wherein m'*k≧c>(m'−1)*k;

encoding a non-zero binary data element N using a number n of bits, wherein the least significant bit of N is equal to 0;

producing a binary data element $J_0(N')$, wherein N' is a binary data element encoded on n bits such that N' has one least significant bit at 1 and $N=N'*2^a$, wherein a is an integer>1;

for each integer i, wherein i is varied from 1 to w−1, wherein w is an integer such that w*1≧c>(w−1)*1, wherein 1 is a number of useful bits of N, performing the steps of:

producing a binary data element $H_i=2^{n+i*1-a}$ mod N' encoded on n bits;

producing a binary data element $C_i$ such that $C=\Sigma_i C_i*2^{i*l}$;

applying the binary data element $H_i$ to the serial input of the multiplication circuit and the binary data element $C_i$ to the parallel input of the multiplication circuit, to obtain a result $P(C_i, H_i)_{N'}=C_i*2^{i*l-a}$ mod N' at the serial output of the multiplication circuit, shifting the result to obtain a value $C_i*2^{i*l-a}$ mod N and storing the value; for i=0, storing $C_0$ when $C_0<N$ and storing $C_0-N$ when $C_0>N$;

performing modular addition of stored values $C_i*2^{i*l}$ mod N to provide a value C mod N.

21. The method of claim 20, wherein the step of producing the binary data element $H_i$ comprises the steps of:

producing of $H_i=2^{n+i*1-a}$ mod N' by, for each integer i>1, performing the steps of:

producing $H_{i,p(i)}=2^{n+2exp(p(i))*(1-a)}$ mod N' with p(i)=Ent [$\log(i_2*1/(1-a))$]+1, wherein Ent designates an "integer part" operator;

when r>n, producing $2^{n-r}$ mod N'; and applying $H_{i,p(i)}$ when n−r>0 and $2^{n-r}$ mod N' when n−r<0, encoded on n bits, to the serial input of the multiplication circuit and, in parallel, applying $2^{n-r}$ when n−r≧0 and $H^{i,p(i)}$ when n−r<0, encoded on n bits, to the parallel input of the multiplication circuit.

* * * * *

UNITED STATES PATENT AND TRADEMARK OFFICE
CERTIFICATE OF CORRECTION

PATENT NO. : 5,764,554
DATED : June 9, 1998
INVENTOR(S) : Guy Monier

It is certified that error appears in the above-identified patent and that said Letters Patent is hereby corrected as shown below:

On the title page, insert item [73] as shown :

[73] Assignee: SGS-Thomson Microelectronics S.A., Saint Genis, France

Column 4, line 4 should read:

E4 - production of $2^a * P(C, H)_{N'} = C \bmod N$.

Signed and Sealed this

First Day of September, 1998

Attest:

Attesting Officer

BRUCE LEHMAN

Commissioner of Patents and Trademarks